US007254482B2

(12) United States Patent
Kawasaki et al.

(10) Patent No.: US 7,254,482 B2
(45) Date of Patent: Aug. 7, 2007

(54) VEHICLE INFORMATION RECORDING SYSTEM

(75) Inventors: Yoshiteru Kawasaki, Kadoma (JP); Tadashi Kobayashi, Ibaraki (JP); Keiichi Senda, Takarazuka (JP); Yoshiyuki Mochizuki, Suita (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/326,153

(22) Filed: Dec. 23, 2002

(65) Prior Publication Data

US 2003/0125854 A1 Jul. 3, 2003

(30) Foreign Application Priority Data

Dec. 28, 2001 (JP) ............................ 2001-399932

(51) Int. Cl.
*G01C 21/28* (2006.01)

(52) U.S. Cl. ...................... 701/211; 701/200; 701/205; 701/36; 701/45; 701/35; 701/117; 701/300; 340/435; 340/436; 382/104

(58) Field of Classification Search .................... 345/9, 345/7; 701/35, 36, 200–202, 204, 206–207, 701/211, 213, 205, 45, 49, 117, 300; 348/148, 348/149, 143, 161, 142; 73/178 R; 340/425.5, 340/426.23, 463, 901, 435–436; 359/630; 382/104; *G08G 1/67*
See application file for complete search history.

(56) References Cited

U.S. PATENT DOCUMENTS 5,420,794 A * 5/1995 James ........................ 701/117

(Continued)

FOREIGN PATENT DOCUMENTS

EP 1324274 A2 * 7/2003

(Continued)

OTHER PUBLICATIONS

P. Arnould et al., Traffic signs locatization for highways inventory from a video camera on board a moving collection van, IEEE Intelligent Vehicles Symposium, IEEE Proceedings 1996 (from Dialog(R) File 8, acc. No. 04641536).*

(Continued)

*Primary Examiner*—Cuong Nguyen
(74) *Attorney, Agent, or Firm*—Wenderoth, Lind & Ponack, L.L.P.

(57) ABSTRACT

A vehicle information recording system 100 includes a picture acquiring unit 101*a* placed in a vehicle that takes a picture of surroundings and generates picture data showing the picture, a vehicle data receiving unit 107 placed in the vehicle that receives other vehicle data concerning another vehicle shown in the picture acquired by the picture acquiring unit 101*a*, an acquired information sending unit 103 placed in the vehicle that sends data including the picture data and the other vehicle data outside of the vehicle, a receiving unit 104 placed outside of the vehicle that receives the data sent by the acquired information sending unit 103, an encoding unit 105 placed outside of the vehicle that encodes the other vehicle data among the data received by the receiving unit 104 and adds the encoded data to the picture data as related data, and a recording unit 106 placed outside of the vehicle that records the picture data to which the other vehicle data is added by the encoding unit 105.

18 Claims, 15 Drawing Sheets

U.S. PATENT DOCUMENTS

| | | | | | |
|---|---|---|---|---|---|
| 5,983,161 | A * | 11/1999 | Lemelson et al. | 701/301 |
| 6,081,206 | A * | 6/2000 | Kielland | 340/937 |
| 6,104,496 | A * | 8/2000 | Minowa et al. | 358/1.12 |
| 6,141,611 | A * | 10/2000 | Mackey et al. | 701/35 |
| 6,233,523 | B1 * | 5/2001 | Sood | 701/213 |
| 6,239,707 | B1 * | 5/2001 | Park | 340/576 |
| 6,252,520 | B1 * | 6/2001 | Asami et al. | 340/903 |
| 6,498,620 | B2 * | 12/2002 | Schofield et al. | 348/148 |
| 2003/0028298 | A1 * | 2/2003 | Macky et al. | 701/35 |
| 2003/0128182 | A1 * | 7/2003 | Donath et al. | 345/156 |
| 2005/0137786 | A1 * | 6/2005 | Breed et al. | 701/200 |

FOREIGN PATENT DOCUMENTS

| | | | |
|---|---|---|---|
| GB | 2268608 | | 1/1994 |
| GB | 2268608 | A * | 1/1994 |
| JP | 07-093627 | | 4/1995 |
| JP | 11-298853 | | 10/1999 |
| WO | WO 9841953 | A1 * | 9/1998 |
| WO | WO 200028410 | A1 * | 5/2000 |
| WO | 01/43104 | | 6/2001 |
| WO | WO 200143104 | A1 * | 6/2001 |

OTHER PUBLICATIONS

Paul G. Luebbers et al., Video-image-based neural network guidance system with adaptive view-angles for autonomous vehicles, Proceedings of SPIE—The International Society for Optical Engineering v 1469, published in 1991 (from Dialog(R) File 8, acc. No. 03384481).*

Unknown author, Electronic truck vision, Fleet owner, vol. 96, No. 10, p. 34, published in Oct. 2001 (from Dialog(R) File 63, acc. No. 00820255).*

Hiwatashi Yutaka et al., Development of active driving assist, Subaru Res. Center Co., Ltd./Subaru Technical Review, 2000, No. 27, pp. 20-28, from Dialog(R) File 94, acc. No. 04618893).*

P. Arnoul et al., Using a Kalman tracker to localize objects from a video sequence. Application to highways inventory of traffic signs from a moving collection van, Gerf EC Lille—Cite Scientifique, Lille, France—Symposium on Robotics and Cybernetics, CESA '96 IMACS Multiconference, Jul. 12, 1996 (from Dialog(R) File 2 acc. No. 06559710).*

P.G. Luebbers et al., Vision-based path following by using a neural network guidance system, Journal of ?Robotic Systems, vol. 11, No. 1, pp. 57-66, published in 1994 (from Dialog(R) File 2 acc. No. 05609611).*

M. Bajuk, Camera evidence: visibility analysis through a multi-camera viewpont, Visual Data Interpretation, Feb. 11, 1991 (from Fialog(R) file 95 acc. No. 00663058 E93033904046).*

* cited by examiner

VEHICLE INFORMATION RECORDING SYSTEM

BACKGROUND OF THE INVENTION (1) Field of the Invention

The present invention relates to a vehicle information recording system for recording information concerning a vehicle.

(2) Description of the Related Art

Recently, there have been an increasing number of devices with functions of supporting a driver's recognition, judgment and operation based on information that is obtained from various types of sensors which are mounted in a vehicle such as a car.

For example, a system for acquiring information such as weather, temperature, humidity and traffic condition and offering such information to a driver has been realized. Also, other systems have been under study, such as a system for giving a warning to a driver while driving in foreseeable danger based on the comparison between lane markers, traffic lights and speed signs that are obtained by pictures taken by an in-vehicle camera and separately calculated vehicle speed data and control data, and a system for giving a warning to a driver by calculating his lines of vision and blinks based on pictures taken by a camera to detect his drowsiness.

On the other hand, there is an idea of storing various information which is acquired by these sensors as driving situations so as to apply such information to the determination of the causes of a traffic accident, an analysis of the driver's driving skill and an analysis of the vehicle's response.

For example, a driving information recording device has been proposed which not only offers driving information that is acquired from various in-vehicle sensors to a driver but which also stores the information in an in-vehicle storage medium. (See Japanese Laid-Open Patent Application No. H7-93627.) This driving information recording device has a function as a system for outputting the stored driving information in the case of an accident, as well as a function as a system for offering appropriate driving information to the driver while driving in a normal condition. This driving information recording device makes it possible to theorize as to the causes of the accident by analyzing the stored driving information which is acquired just before and after the accident.

Furthermore, a driving situation recording device has also been proposed. This driving situation recording device includes a recording unit which periodically records pictures from the inside or outside of the vehicle that are taken by a surveillance camera in addition to driving information such as GPS (global positioning system) data, vehicle speed data, steering angle data and braking data, and a control unit which stops the recording unit to record the pictures and the driving information when an accident occurs. (See Japanese Laid-Open Patent Application No. H11-298853.) This driving situation recording device makes it possible to store the driving information that is acquired for a fixed time period just before the accident so as to acquire information which is useful for analyzing the causes of the accident.

However, according to both of these conventional devices, an accident is analyzed based on the data which is acquired by the vehicle that is involved in the accident. Therefore, there is a problem in that the accident is analyzed based on only the pictures which are taken by the camera in the vehicle that is involved in the accident. In the case of an accident between two or more vehicles, for instance, the pictures of one vehicle which are taken from the other vehicle can only be obtained. Therefore, there is a problem in that clear circumstances of the accident are not available, and thus, the accident cannot be specifically analyzed.

There is also a problem in that the data such as the pictures cannot be acquired just after the accident when the in-vehicle camera is damaged, and thus, the accident cannot be specifically analyzed.

SUMMARY OF THE INVENTION

In order to solve the aforesaid problems, an object of the present invention is to provide a vehicle information recording system which allows for the specific analysis of an accident.

In order to achieve the stated object, the vehicle information recording system according to the present invention is a vehicle information recording system comprising an information acquisition device which is placed in a vehicle that acquires predetermined information, and an information management device which is placed outside of the vehicle that stores and manages the information acquired by the information acquisition device. The information acquisition device includes a picture acquiring unit which is operable to take a picture of surroundings and to generate picture data showing the picture, an other vehicle data generating unit which is operable to generate other vehicle data which specifies another vehicle shown in the picture data, and a sending unit operable to send sending data including the picture data and the other vehicle data. The information management device includes a receiving unit which is operable to receive the sending data that is sent by the sending unit, an adding unit which is operable to add the other vehicle data as related data to the picture data included in the sending data that is received by the receiving unit, a recording unit which is operable to record the picture data to which the related data is added on a recording medium, and a searching unit which is operable to search the data recorded in the recording medium for picture data which shows the other vehicle based on the other vehicle data.

According to this structure, those who analyze the accident can acquire picture data of the vehicle other than the vehicle which took the pictures by using a picture acquiring unit therein. When the other vehicle is involved in the accident, the picture data of the other vehicle is taken from the vehicle that is different from the other vehicle which was involved in the accident, where such picture data shows the circumstances of the accident more objectively and clearly than the picture data that is taken from the other vehicle which was involved in the accident. Therefore, the clear circumstances of the accident are available to those who analyze the accident.

Also, the pictures that were taken from the camera in the vehicle which was involved in the accident sometimes cannot be acquired just after the accident due to the damage of the camera in the vehicle which was involved in the accident, but the picture data taken from the vehicle that is different from the vehicle which was involved in the accident is not lost due to the damage of the camera.

Furthermore, the other vehicle data specifying the other vehicle that is seen in the aforesaid picture data is added to that picture data. Since the searching unit searches for the picture data based on this other vehicle data, those who analyze the accident can easily search for the aforesaid picture data so as to acquire the desired picture data.

Here, the information acquisition device may further include a driving information acquiring unit which is operable to acquire driving-related information concerning a driving situation of the vehicle, the sending unit may send the sending data including the driving-related information to the outside of the vehicle, the adding unit may further add the driving-related information that is included in the sending data that is received by the receiving unit to the picture data as related data, and the searching unit may obtain the driving-related information together with the searched picture data.

According to this structure, those who analyze the accident can acquire the driving-related information of the vehicle which took the picture data of the other vehicle. Therefore, those who analyze the accident can acquire the information such as the weather and the traffic conditions at the time of the accident involving the other vehicle which was running nearby, based on this driving-related information, and thus grasp the clear circumstances of the accident.

Here, the information acquisition device may further include a picture information acquiring unit which is operable to acquire picture-related information concerning a picture-taking condition of the picture acquiring unit, the sending unit may send the sending data including the picture-related information to the outside of the vehicle, the adding unit may further add the picture-related information included in the sending data that is received by the receiving unit to the picture data as related data, and the searching unit may obtain the picture-related information together with the searched picture data.

According to this structure, since those who analyze the accident can obtain the picture-related information in the condition where the picture data of the other vehicle was taken, they can further grasp the clear circumstances of the accident based on the picture data and the picture-related information.

Here, the vehicle information recording system may comprise a plurality of the information acquisition devices which are respectively placed in a plurality of vehicles, wherein the information acquisition device in each of the vehicles sends the sending data including own vehicle data specifying the vehicle itself in which the information acquisition device is placed, the adding unit further adds the own vehicle data corresponding to each vehicle to the picture data included in the sending data of each vehicle that is received by the receiving unit, and the searching unit searches for desired picture data based on the other vehicle data or the own vehicle data.

According to this structure, those who analyze the accident can acquire the picture data of the vehicle which is involved in the accident taken by the vehicle unrelated to the accident based on the other vehicle data, as well as the picture data that is taken by the vehicle that is involved in the accident based on the own vehicle data, and thus grasp the clear circumstances of the accident.

Here, the recording medium may include a plurality of recording mediums which are connected to each other via a network, and the adding unit may further add location information on the network where one of the two picture data is recorded by the recording unit to the other picture data as related data, one of the picture data is generated by the picture acquiring unit that is placed in one of a plurality of the vehicles, and the other picture data is generated by the picture acquiring unit that is placed in the other vehicle shown in the one picture data which is generated by the picture acquiring unit in the one vehicle of the plurality of vehicles.

According to this structure, those who analyze the accident can acquire one picture data based on the data that is added to the other picture data from among a plurality of the picture data concerning the vehicle which is involved in the accident.

Here, the picture acquiring unit may have a camera that takes a picture of surroundings, the other vehicle data acquiring unit may have a receiver that receives the other vehicle data that is transmitted from the other vehicle, and the directivity of the receiver may match with a viewing angle of a picture taken by the camera.

According to this structure, the receiver can receive the other vehicle data of the other vehicle that is seen in the picture data which is taken by the camera.

Here, the information acquisition device may further include a color information acquiring unit which is operable to acquire color information that is indicated by a traffic light shown in the picture data, the sending unit may send the sending data including the color information that is acquired by the color information acquiring unit to the outside of the vehicle, and the adding unit may further add the color information that is included in the sending data received by the receiving unit to the picture data as related data.

According to this structure, since the color information that is indicated by the traffic light is added to the picture data, those who acquire that picture data can grasp the clear circumstances of the accident.

Here, the recording medium may include a plurality of recording mediums which are connected with each other via a network.

According to this structure, a lot of data can be recorded in the recording medium.

Here, the information acquisition device may further include a driving situation determining unit which is operable to determine a driving situation of the vehicle based on the driving-related information that is acquired by the driving information acquiring unit, and the sending unit may notify an emergency contact station of an accident of the vehicle when the driving situation determining unit determines that the vehicle was involved in the accident.

According to this structure, the emergency contact station can be notified of an occurrence of an accident immediately and without fail.

Also, in order to achieve the above-mentioned object, the present invention additionally provides a vehicle information recording method for a vehicle information recording system comprising an information acquisition device which is placed in a vehicle that acquires predetermined information, and an information management device which is placed outside of the vehicle that stores and manages the information that is acquired by the information acquisition device. In the information acquisition device, the vehicle information recording method performs a picture acquiring step for taking a picture of surroundings and generating picture data showing the picture, an other vehicle data generating step for generating other vehicle data which specifies an other vehicle that is shown in the picture data, and a sending step for sending data including the picture data and the other vehicle data. In the information management device, the vehicle information recording method performs a receiving step for receiving the sending data that is sent in the sending step, an adding step for adding the other vehicle data as related data to the picture data included in the sending data that is received in the receiving step, a recording step for recording the picture data to which the related data is added in a recording medium, and a searching step for searching the data that is recorded in the recording medium for picture data which shows the other vehicle based on the other vehicle data.

According to this structure, the same effects as those described above can be obtained.

BRIEF DESCRIPTION OF THE DRAWINGS

These and other objects, advantages and features of the present invention will become apparent from the following description when taken in conjunction with the accompanying drawings which illustrate specific embodiments of the present invention.

DETAILED DESCRIPTION OF THE INVENTION

The First Embodiment

Figure 1:
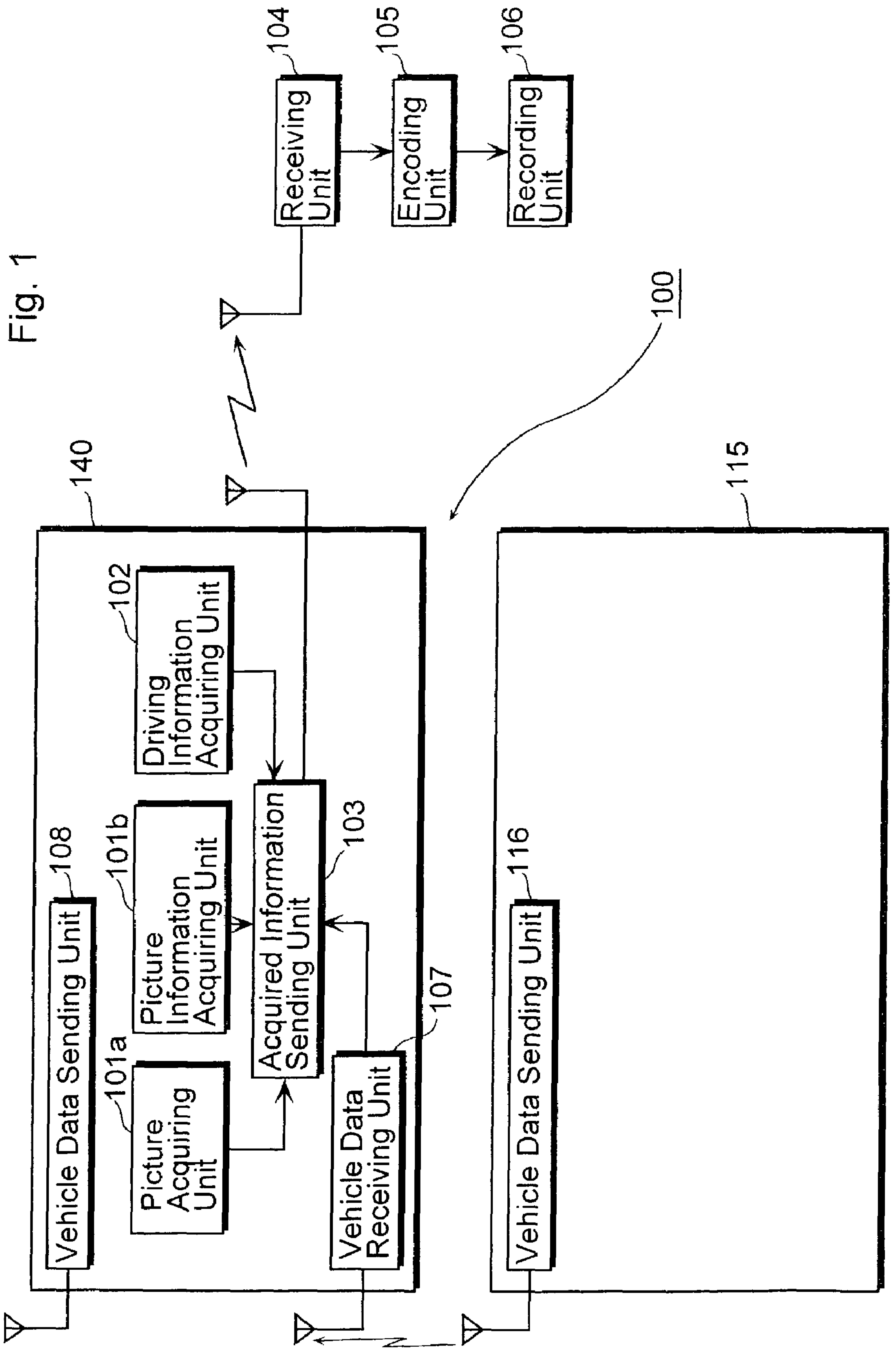
FIG. 1 is a block diagram showing an overall structure of the vehicle information recording system according to a first embodiment of the present invention.

The first embodiment of the present invention will be explained with reference to the drawings. FIG. 1 is a block diagram showing an overall structure of the vehicle information recording system according to the first embodiment of the present invention.

The vehicle information recording system 100 includes an in-vehicle information acquiring unit 140 which is mounted in a vehicle such as a car. The in-vehicle information acquiring unit 140 includes a picture acquiring unit 101*a*, a picture information acquiring unit 101*b*, a driving information acquiring unit 102, a vehicle data receiving unit 107, a vehicle data sending unit 108, and an acquired information sending unit 103. The vehicle information recording system 100 also includes an in-vehicle information acquiring unit 115 which is mounted in another vehicle. The in-vehicle information acquiring unit 115 includes a vehicle data sending unit 116. The vehicle information recording system 100 also includes a receiving unit 104, an encoding unit 105 and a recording unit 106, which are respectively placed outside the vehicles.

Figure 2:
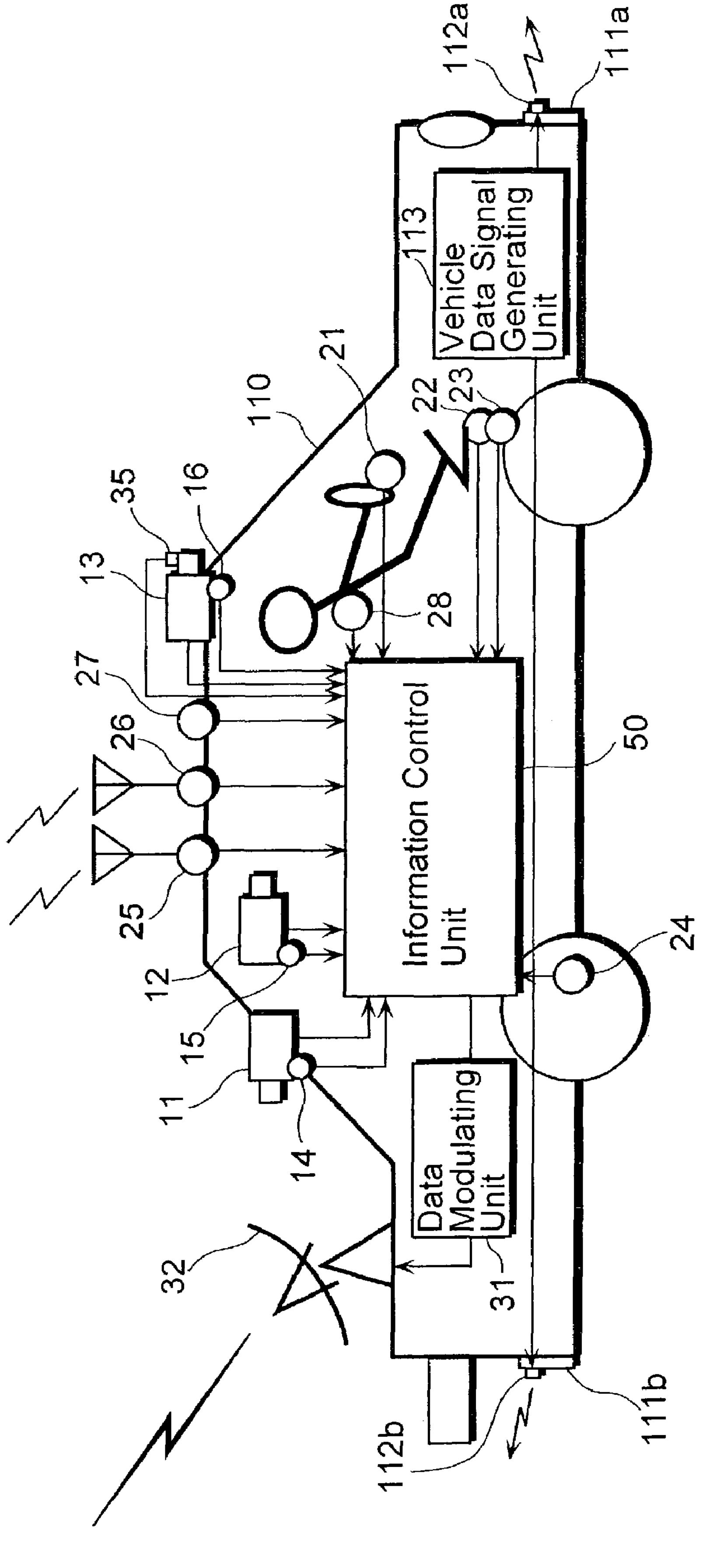
FIG. 2 is a diagram showing how respective units in the vehicle information recording system are mounted in a vehicle.

FIG. 2 is a diagram showing how the respective units in the vehicle information recording system 100 are mounted in a vehicle 110.

The picture acquiring unit 101*a* includes cameras 11, 12, 13 which are mounted in and on an outer surface of the vehicle 110 for taking pictures of the surroundings, and an information control unit 50 which adds ID information indicating by which one of the cameras 11, 12, 13 a picture was taken and a picture-taking time to the picture data taken by the cameras 11, 12, 13. The picture acquiring unit 101*a* acquires (generates) picture data of the inside and the outside of the vehicle 110 and adds information specifying the picture to the acquired picture data.

The picture information acquiring unit 101*b* includes camera parameter acquiring units 14, 15, 16 which acquire, as camera parameter information of the respective cameras 11, 12, 13, camera characteristics such as a shutter speed, an angle of view (viewing angle) and a position and attitude (orientation angle). The picture information acquiring unit 101*b* also includes the information control unit 50 which adds the ID information indicating by which one of the cameras 11, 12, 13 a picture was taken and the picture-taking time to the acquired camera parameter information. The picture information acquiring unit 101*b* acquires (generates) the camera parameter information concerning (pertaining to) the conditions of the pictures that were taken by the cameras 11, 12, 13, and adds the ID information specifying, the camera parameter information and the picture-taking times.

Figure 4:
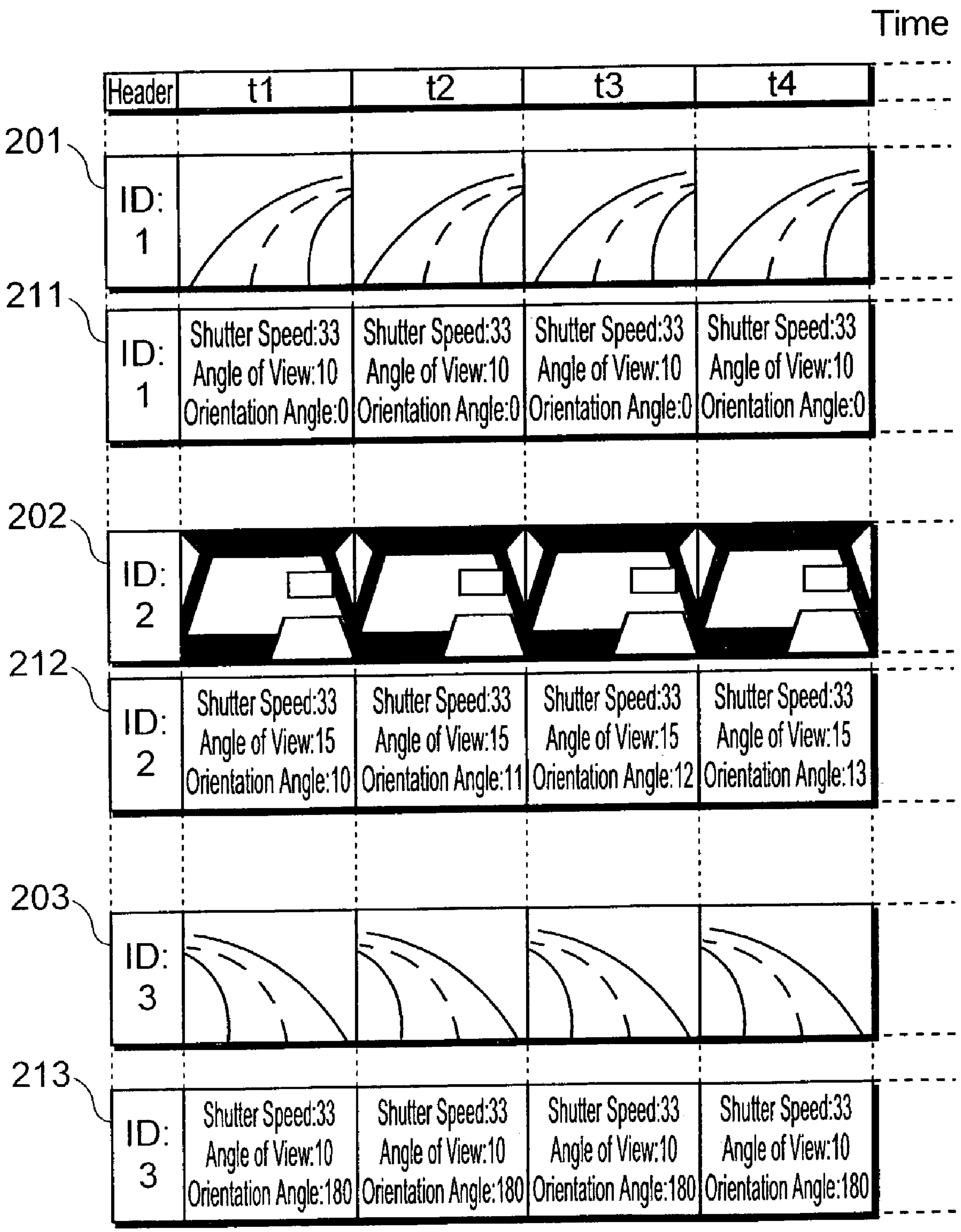
FIG. 4 is data diagram showing samples of picture data and camera parameter information which are respectively acquired by the units in the vehicle information recording system.

FIG. 4 is a data diagram showing samples of the picture data which are respectively acquired by the cameras 11, 12, 13 and the camera parameter information which are respectively acquired by the camera parameter acquiring units 14, 15, 16.

Picture data 201 shows pictures of the front view from the perspective of vehicle which are taken by the camera 13. Picture data 202 shows pictures of inside the vehicle which are taken by the camera 12. Picture data 203 shows pictures of the rear view from the perspective of the vehicle which are taken by the camera 11. The picture data 201, 202 and 203 show the pictures that are taken at the times t1, t2, t3 and t4, respectively.

The ID information for uniquely identifying the camera which took the pictures is described in the header sections of the picture data 201, 202 and 203. Numbers, which are predetermined for each camera and which are all different from each other, are assigned to the ID information (for example, ID: 1 for the camera 13, ID: 2 for the camera 12, and ID: 3 for the camera 11). This ID information allows for the camera which took the pictures to be uniquely identified.

The ID information may alternatively be described in the vertical blanking intervals instead of in the header sections.

The camera parameter information 211 shows the camera parameter information which corresponds to the camera 13. The camera parameter information 212 shows the camera parameter information which corresponds to the camera 12. The camera parameter information 213 shows the camera parameter information which corresponds to the camera 11.

In the camera parameter information 211, 212 and 213, the ID information specifying the above-mentioned cameras is described in the header sections thereof, and the camera parameter information such as the camera characteristics like the shutter speed, the angle of view and the position and attitude (orientation angle) of the camera which is specified by the ID information is described. Also, in the camera parameter information 211, 212 and 213, the time count values (t1, t2, t3 and t4), which are same as those of the picture data 201, 202 and 203, are described.

The driving information acquiring unit 102 acquires (generates) driving-related information such as behavior information indicating the driving behavior of the vehicle, environmental information indicating the running environment of the vehicle, and driver information indicating the driver's condition of the vehicle. The driving information acquiring unit 102 also adds information indicating the times of acquiring the driving-related information to the driving-related information so as to synchronize with the picture-taking times of the cameras 11, 12 and 13.

The driving information acquiring unit 102 includes a rotation angle sensor 21 for acquiring a steering angle of a vehicle, an accelerator switch 22 for detecting an accelerator manipulated variable, a brake switch 23 for detecting a brake manipulated variable, a speed sensor 24 for detecting a vehicle speed, a GPS information acquiring unit 25 that receives GPS information for detecting a vehicle location, a VICS (vehicle information control system) information acquiring unit 26 that receives VICS information for detecting traffic information, a temperature/precipitation sensor 27 for detecting the temperature and precipitation, and a body temperature/heartbeat sensor 28 for detecting a driver's body temperature and pulse (heartbeat). The driving information acquiring unit 102 also includes the information control unit 50 which adds time count values indicating the detecting times to the detected data which are the driving-related information obtained by each unit.

The rotation angle sensor 21, accelerator switch 22, brake switch 23, speed sensor 24 and GPS information acquiring unit 25 acquire the driving-related information indicating the vehicle's behavior. The VICS information acquiring unit 26 and temperature/precipitation sensor 27 acquire the driving-related information indicating the vehicle's running environment. The body temperature/heartbeat sensor 28 acquires the driving-related information indicating the driver's condition.

More specifically, the rotation angle sensor 21, which is mounted on the steering wheel, acquires steering information. The accelerator switch 22 and the brake switch 23, which are mounted on the accelerator pedal and the brake pedal, respectively, acquire the accelerator manipulated variable and the brake manipulated variable, respectively. The speed sensor 24, which is mounted on at least one tire, acquires the vehicle speed information. The GPS information acquiring unit 25, which receives radio waves to identify its own location, acquires the vehicle location information, i.e., the present location of the vehicle 110.

Furthermore, the VICS information acquiring unit 26, which acquires VICS information that is sent by radio waves, acquires the traffic information. The temperature/precipitation sensor 27 such as a thermometer and a pluviometer, which is mounted on the outer surface of the vehicle, acquires the temperature and precipitation (the weather information). The weather information such as the temperature and precipitation may be actually measured and acquired by using a thermometer and a pluviometer, or the weather information may be acquired by receiving information transmitted from the outside of the vehicle such as AMEDAS information that is distributed by the Meteorological Agency. Also, the body temperature/heartbeat sensor 28 such as a pulse meter and a clinical thermometer, which is mounted on the driver's seat, acquires the driver's pulse and body temperature by measuring the pulse and body temperature at appropriate body parts. The pulse meter and the clinical thermometer may be embedded in the steering wheel for the driver.

The vehicle data receiving unit 107 includes a receiver 35 which is mounted on the top of the camera 13 and the information control unit 50. The receiver 35 receives an other vehicle data signal specifying the vehicle from the vehicle data sending unit 116 of the other vehicle. This vehicle data sending unit 116, having a transmitter on the registration plate (license plate) of the other vehicle, sends the other vehicle data signal. This other vehicle data signal is a signal which is specific to the vehicle, and includes information indicating the registration number of the vehicle. In order to synchronize with the picture-taking times of the cameras 11, 12 and 13, the information control unit 50 adds the time count values indicating the receiving times to the other vehicle data such as the vehicle registration number which is obtained from the other vehicle data signal which is received by the receiver 35 of the vehicle data receiving unit 107.

The information control unit 50 serves its functions for the picture acquiring unit 101*a*, the picture information acquiring unit 101*b*, the driving information acquiring unit 102 and the vehicle data receiving unit 107, and adds the time count values which are measured by the same time counter to the data sent from the respective units.

Also, the vehicle data sending unit 108 includes transmitters 112*a* and 112*b* which are respectively mounted on registration plates 111*a* and 111*b* that are mounted on the front and rear of the vehicle 110, and a vehicle data signal generating unit 113, as shown in FIG. 2. The transmitters 112*a* and 112*b* transmit the vehicle data signal that is specific to the vehicle which is generated by the vehicle data signal generating unit 113 to the other vehicles. This vehicle data signal that is specific to the vehicle is a data signal indicating the registration number of the vehicle 110, for instance.

The acquired information sending unit 103 includes a data modulating unit 31 which modulates each information for radio transmission and a sending antenna 32 which transmits the information by radio waves. The acquired information sending unit 103 sends, to the outside of the vehicle by radio communication, the information including the picture data that is acquired by the picture acquiring unit 101*a*, the picture-related information that is acquired by the picture information acquiring unit 101*b*, the driving-related information that is acquired by the driving information acquiring unit 102, and the other vehicle data that is acquired by the vehicle data receiving unit 107 as the sending data. At that time, in order to show that each information is the information of the vehicle 110, the acquired information sending unit 103 sends each information by adding the own vehicle data specifying the vehicle 110 thereto. This own vehicle data is obtained from the vehicle data signal that is specific to the vehicle which is generated by the vehicle data signal generating unit 113.

Figure 3:
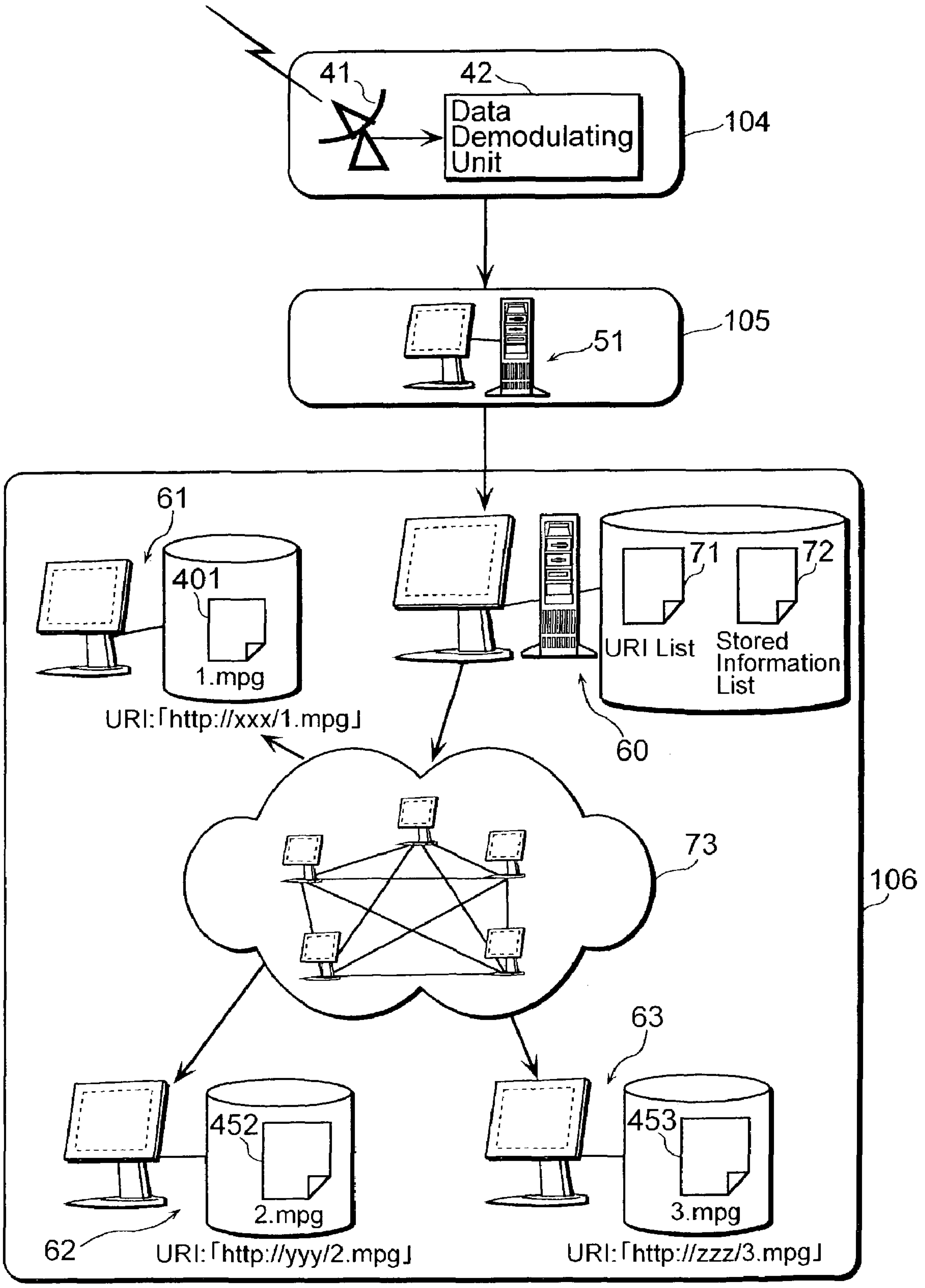
FIG. 3 is a diagram showing a schematic configuration of the respective units in the vehicle information recording system.

FIG. 3 is a diagram showing a schematic configuration of the respective units that receive, encode and store each information that is sent from the vehicle 110 in the vehicle information recording system 100.

The receiving unit 104 includes a receiving antenna 41 that receives each information such as the picture data, the picture-related information, the driving-related information and the vehicle data which are sent from the acquired information sending unit 103 that is mounted in the vehicle 110. The receiving unit 104 also includes a data demodulating unit 42 which demodulates each of the above-described received information. The receiving unit 104 receives and demodulates each information that is sent from the vehicle 110, and transmits the demodulated information to the encoding unit 105.

The encoding unit 105 includes one or more calculators 51. The encoding unit 105 encodes each information that is transferred from the receiving unit 104 and creates an integrated driving information file in a format in which metadata that is related to the picture data and header information are added to the picture data. At that time, the encoding unit 105 adds the picture-related information, the driving-related information and the vehicle data which indicate the content of the picture to the picture data, and describes the resultant data by using a descriptor defined by the MPEG7 standard that defines a framework for describing the contents of multimedia information.

Figure 5:
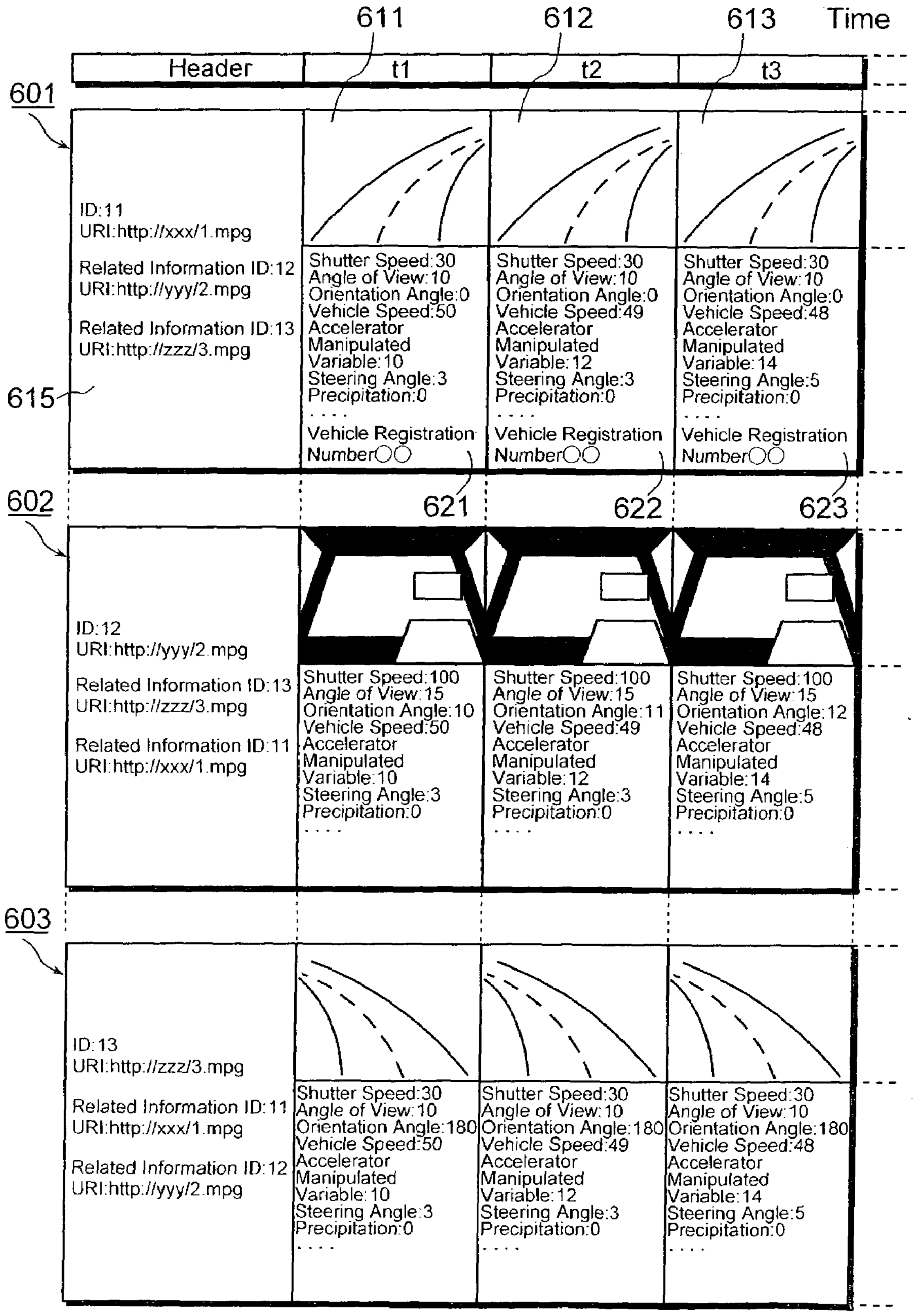
FIG. 5 is a data diagram showing samples of an integrated driving information file which is created by an encoding unit in the vehicle information recording system.

FIG. 5 is a data diagram showing samples of the integrated driving information file for each camera which is created by the encoding unit 105.

Integrated driving information file 601 is an information file of the pictures taken by the camera 13. Integrated driving information file 602 is an information file of the pictures taken by the camera 12. Integrated driving information file 603 is an information file of the pictures taken by the camera 11.

In order to explain each of the integrated driving information files, the integrated driving information file 601 will be taken as an example. The integrated driving information file 601 includes a header section 615, picture data 611, 612 and 613 taken at the times t1, t2 and t3, respectively, and metadata sections 621, 622 and 623 where metadata relating to the picture data 611, 612 and 613 that are respectively taken at the times t1, t2 and t3 is described.

Described in the header section 615 are ID information (ID: 11 in the example of the integrated driving information file 601) which uniquely specifies picture data, for instance, information indicating which camera of which vehicle took that picture data, and URI (http://xxx/1.mpg) indicating the location information on the network of the integrated driving information file 601 which is stored in the recording unit 106.

In the header section 615, information concerning the integrated driving information files 602 and 603 which are created from the picture data that are taken by the other cameras 12 and 13 of the vehicle 110 is further described as the related information for the integrated driving information file 601. Specifically, ID information (ID: 12, ID: 13) which specifies the picture data of the integrated driving information files 602 and 603, respectively, and URIs (http://yyy/2.mpg, http://zzz/3.mpg) which are the location information on the network of the integrated driving information filed 602 and 603, respectively, are described. This ID information is described by using "UniqueIdentifier" descriptor which is defined by the MPEG7 standard. The URIs are described by using a "MediaLocator" descriptor which is defined by the MPEG7 standard.

In the metadata sections 621, 622 and 623, the camera parameter information such as the shutter speed, the angle of view and the orientation angle of the camera 13 which is acquired by the camera parameter acquiring unit 16, the driving-related information such as the vehicle speed and the accelerator manipulated variable which is acquired by each unit of the driving information acquiring unit 102, and the other vehicle data of the other vehicles such as the vehicle registration number ○○ which is acquired by the vehicle data receiving unit 107 are described. The camera parameter information, the driving-related information and the other vehicle data are described in the metadata sections 621, 622 and 623 in synchronization with the times t1, t2 and t3 when the picture data 611, 612 and 613 are taken.

The recording unit 106 is a calculator having a storage medium which manages and controls data storage, as shown in FIG. 3. The recording unit 106 includes an information storage server 60 and one or more storage mediums 61, 62 and 63 which are connected to the information storage server 60 via a network 73.

The information storage server 60 includes a URI list 71 that lists URIs indicating the location information of the storage mediums 61, 62 and 63 on the network 73, and a stored information list 72 that indicates the information of the data stored in the storage mediums 61, 62 and 63.

The information storage server 60 has a function of searching for desired data based on a keyword which is specified by the URI list 71, the stored information list 72 and/or which is specified externally.

Upon receipt of a signal indicating an inquiry about the URI of the storage medium for storing the integrated driving information file from the encoding unit 105, the information storage server 60 selects an arbitrary storage medium from among the storage mediums 61, 62 and 63 listed in the URI list 71, and transfers the URI of the selected storage medium to the encoding unit 105. Upon receipt of the integrated driving information file from the encoding unit 105, the information storage server 60 stores the integrated driving information with the file name that is indicated by the URI which is described in the header section of the integrated driving information file in the storage medium that is indicated by that URI via the network 73.

As the storage medium of the information storage server 60 or the storage mediums 61, 62 and 63, various mediums such as a magnetic disc including HDD, a magnetic tape including DAT and an optical disc including CD or DVD may be used, but it is desirable to use a storage medium with a high access speed such as a HDD which allows reading out and searching for recorded data at the same time of writing it in the data. Using this type of storage medium, it is possible to store a vehicle's driving information while searching for the stored data of another vehicle, and thus it is possible to use the storage medium efficiently.

According to the first embodiment, the information storage server 60 in the recording unit 106 stores the data separately in a plurality of the storage mediums 61, 62 and 63 which are connected to each other via the network 73 but located at remote sites, for instance. Alternatively, the information storage server 60 may store all of the data in one storage medium.

Next, the operation of the vehicle information recording system 100 structured as described above will be explained by using a few case examples.

(Case 1)

Figure 6:
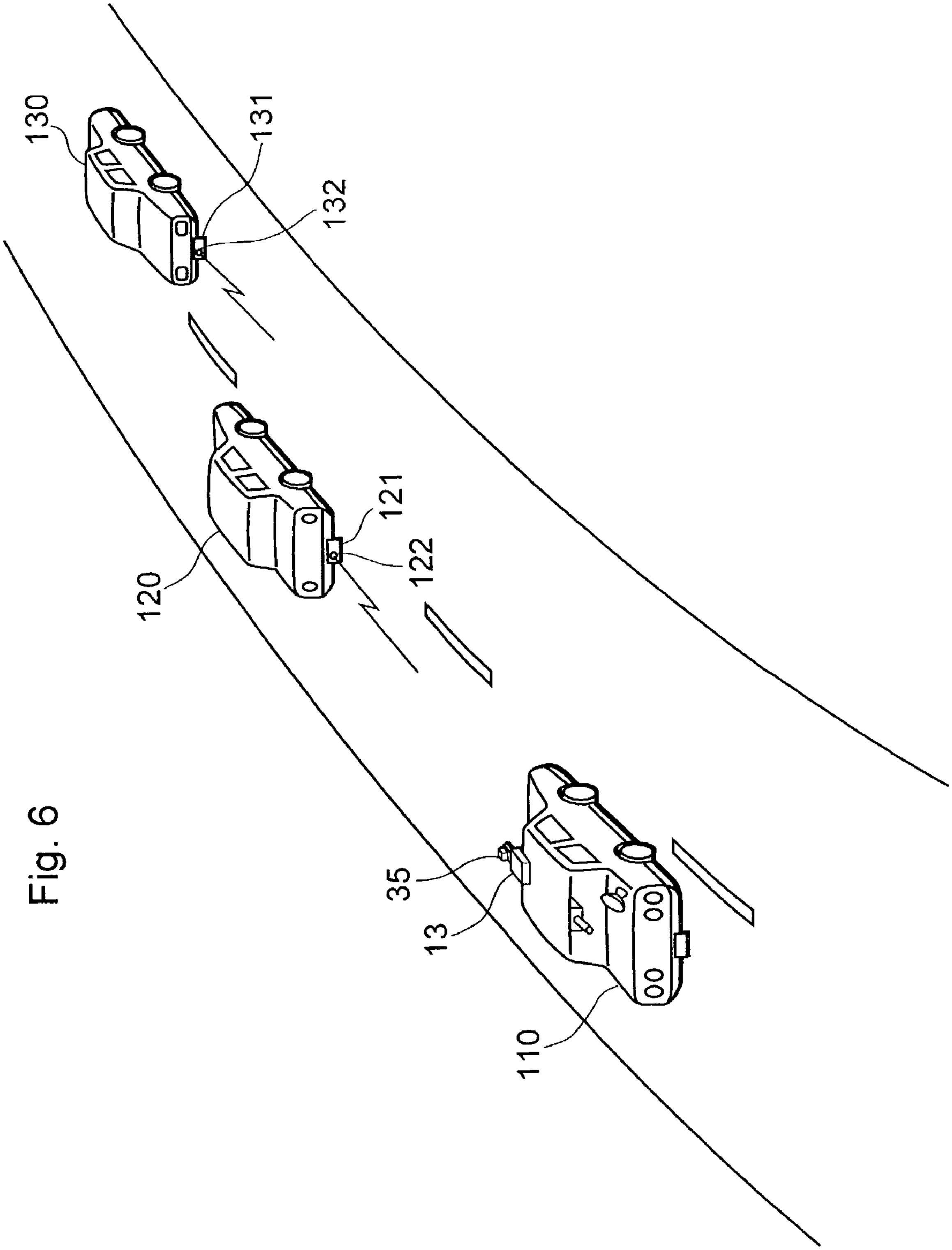
FIG. 6 is a diagram showing a running condition on the road of the vehicles which are equipped with the vehicle information recording system.

FIG. 6 is a diagram showing a running condition on the road of the vehicles which are equipped with the vehicle information recording system 100 of the first embodiment. FIG. 6 shows the running condition of the vehicle 110. In the front of the vehicle 110, the vehicle 120 is running, and further in front of the vehicles 110 and 120, the vehicle 130 is coming from the opposite direction.

Figure 7:
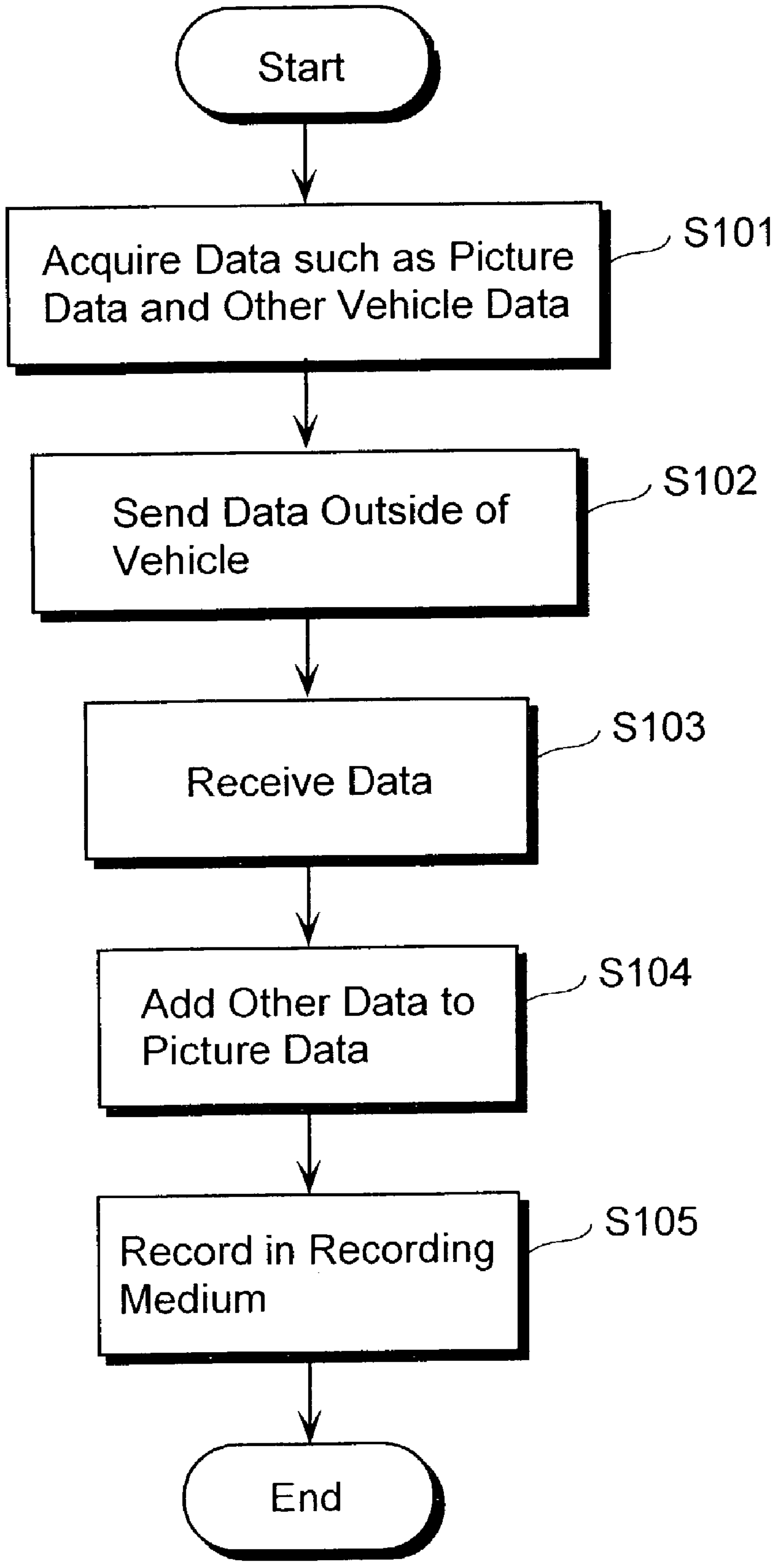
FIG. 7 is a flowchart showing a schematic operation in the vehicle information recording system.

FIG. 7 is a flowchart showing the schematic operation in the vehicle information recording system 100.

First, the picture acquiring unit 101*a*, the picture information acquiring unit 101*b*, the driving information acquiring unit 102, and the vehicle data receiving unit 107 which are mounted on the vehicle 110 acquire data such as picture data, picture-related information, driving-related information and other vehicle data (Step S101).

More specifically, the cameras 11, 12 and 13 which are mounted on the vehicle 110 acquire pictures of the rear view, the front view and the inside of the vehicle 110 that are taken at fixed intervals on an intermittent basis.

Also, the camera parameter acquiring units 14, 15 and 16 respectively acquire the camera parameter information that is the picture-related information such as the shutter speed, angle of view and orientation angle (position and attitude) of the cameras 11, 12 and 13.

Figure 8:
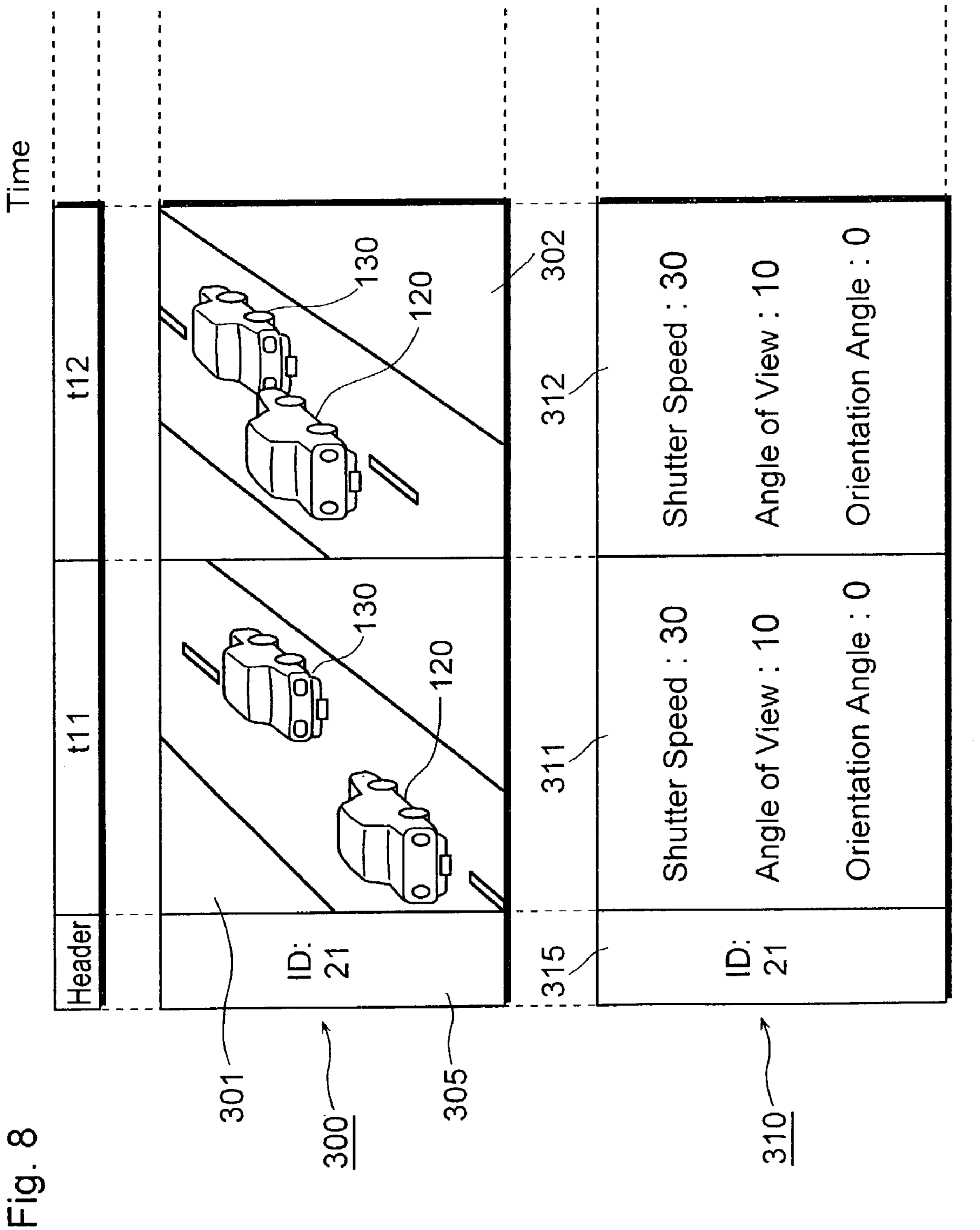
FIG. 8 is a data diagram showing picture data and camera parameter information which are respectively acquired by the units in the vehicle information recording system.

FIG. 8 is a data diagram showing the picture data and the picture-related information which are taken by the camera 13 at the respective times. The other cameras 11 and 12 and the picture data and the picture-related information taken at the time 13 and thereafter are not shown in FIG. 8.

In FIG. 8, the picture information 300 has a header section 305 indicating header information and picture data 301 and 302 that are taken at the times t11 and t12, respectively. Also, the picture-related information 310 has a header section 315 indicating header information and camera parameter information 311 and 312 of the camera 13 which took the pictures shown in the picture data 301 and 302, respectively.

Next, the information control unit 50 describes ID information that can uniquely identify the camera 13 which took the pictures in the header section 305 of the picture information 300. The information control unit 50 may alternatively describe this ID information in the vertical blanking interval instead of in the header section. Numbers which are different from each other and which are preset for the respective cameras (ID=21, for instance) are assigned to the ID information. This ID information enables the camera which took the picture data to be uniquely identified.

Then, the information control unit 50 describes time count values indicating the times t11 and t12 when the pictures were taken in the picture data 301 and 302.

Furthermore, the information control unit 50 describes ID information that can uniquely identify the camera 13 which took the pictures in the header section 315 of the picture-related information 310. At that time, the information control unit 50 may alternatively describe the ID information in the vertical blanking interval instead of in the header section. Numbers which are different from each other and which are preset for the respective cameras (ID=21, for instance) are assigned to the ID information. This ID information enables the information to which cameras the parameter information 311 and 312 correspond to be uniquely identified.

Then, the information control unit 50 describes time count values indicating the times t11 and t12 when the picture data 301 and 302 were taken in the camera parameter information 311 and 312, respectively.

The rotation angle sensor 21, the accelerator switch 22, the brake switch 23, the speed sensor 24, the GPS information acquiring unit 25, the VICS information acquiring unit 26, the temperature/precipitation sensor 27 and the body temperature/heartbeat sensor 28 which are included in the driving information acquiring unit 102 respectively acquire the above-mentioned driving-related information at fixed intervals on an intermittent basis.

The information control unit 50 adds time count values that are measured by the same clock as that which measured the picture-taking times of the picture data 301 and 302 to the driving-related information that is acquired by the respective units which are included in the driving information acquiring unit 102 so as to synchronize with the picture data 301 and 302 shown in FIG. 8.

Also, as shown in FIG. 6, the receiver 35 of the vehicle data receiving unit 107 which is mounted on the top of the camera 13 mounted on the vehicle 110 receives the other vehicle data signal, that is transmitted from the transmitter 122 which is mounted on the registration plate 121 on the rear of the vehicle 120 and the other vehicle data signal that is transmitted from the transmitter 132 which is mounted on the registration plate 131 on the front of the vehicle 130. The other vehicle data signal that is transmitted from the transmitter 122 of the vehicle 120 is a signal which is specific to the vehicle 120 and includes information indicating the registration number of the vehicle 120, for instance. The other vehicle data signal that is transmitted from the transmitter 132 of the vehicle 130 is also a signal which is specific to the vehicle 130 and includes information indicating the registration number of the vehicle 130, for instance.

The directivity of the receiver 35 for receiving signals is adjusted so as to match with the viewing angle of the camera 13. That is, when the receiver 35 is receiving the vehicle data signals from the respective transmitters 122 and 132 mounted on the vehicles 120 and 130, the vehicle 120 and the vehicle 130 come out (appear) in the pictures that are taken by the camera 13.

The information control unit 50 adds time count values that are measured by the same clock as that which measured the picture-taking times of the picture data 301 and 302 to the other vehicle data that are obtained by the other vehicle data signals which are received by the receiver 35 so as to synchronize with the picture data 301 and 302 shown in FIG. 8.

The information control unit 50 transfers the data with the above-mentioned time count values added thereto, that is, the picture data, the picture-related information, the driving-related information and the vehicle data, to the acquired information sending unit 103 in sequence.

Next, the acquired information sending unit 103 sends the transferred information outside the vehicle in sequence by radio communication (Step S102). At that time, the data modulating unit 31 in the acquired information sending unit 103 adds the own vehicle data indicating the information of the vehicle 110 to each data, and further modulates each data into a data format which enables radio transmission by using the existing technology. The sending antenna 32 sends the modulated data outside the vehicle. A communication system using a cell phone is used as an easy way of sending the modulated data.

At that time, the data modulating unit 31 quantizes and samples each data if necessary, and it is further desirable to compress the data if possible. Also, the data modulating unit 31 may modulate the data for strengthening the robustness against data error during communication, or the data modulating unit 31 may encrypt the data for ensuring the data security.

Next, the receiving unit 104 receives each data that is sent from the acquired information sending unit 103 (Step S103). First, the receiving antenna 41 receives each data that is sent from the acquired information sending unit 103. Since this received data is modulated for wireless transmission, the data demodulating unit 42 demodulates each data.

At that time, if each data is modulated for strengthening the robustness against data error or is encrypted, the data demodulating unit 42 demodulates or decrypts the data. In this case, it is conceivable to display each data on a monitor or the like so as to check and monitor the vehicle's behavior and the driver's condition from a remote site in real time while receiving and demodulating the data.

The receiving unit 104 transfers this received data to the encoding unit 105.

Next, the encoding unit 105 adds the other data including the picture-related information, the driving-related information and the other vehicle data to the picture data (Step S104).

Step S104 will be explained below in more detail. The encoding unit 105 compresses and encodes the picture data that are taken by the cameras 11, 12 and 13 according to the standard such as MPEG, MPEG2 and MPEG4 by using one or more calculators 51.

Then, the encoding unit 105 encodes the picture-related information that is acquired by the picture information acquiring unit 101*b*, the driving-related information that is acquired by the driving information acquiring unit 102 and the other vehicle data that is received by the vehicle data receiving unit 107 according to the method which will be described later, and creates the integrated driving information file which is obtained by embedding this encoded information in the picture data as the metadata relating to the picture data.

Figure 9:
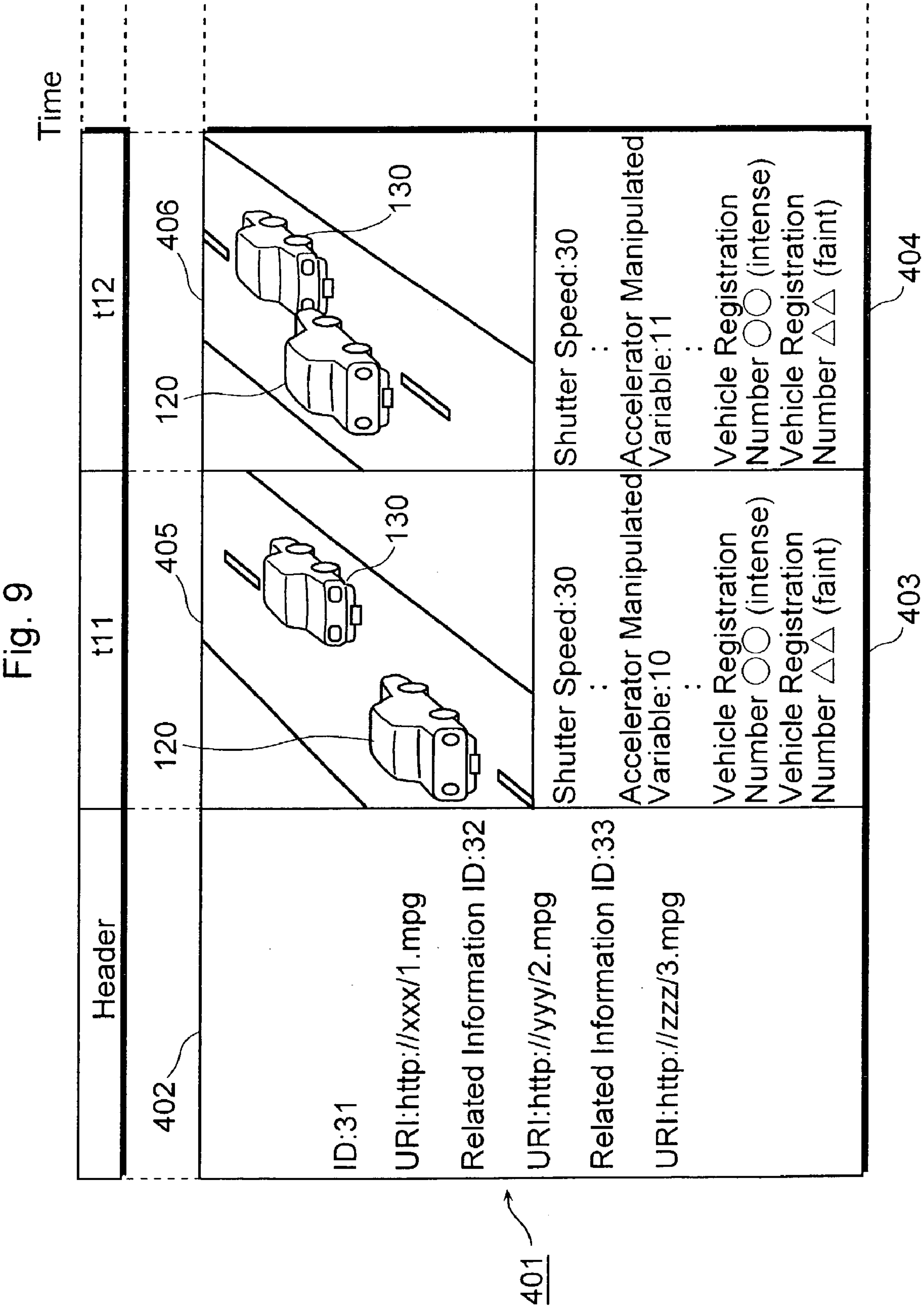
FIG. 9 is a data diagram showing an integrated driving information file which is created by the encoding unit in the vehicle information recording system.

FIG. 9 is a data diagram showing the integrated driving information file which is created by the encoding unit 105. FIG. 9 shows only the integrated driving information file of the pictures that are taken by the camera 13, and the cameras 11 and 12 and the data taken at the time t13 and thereafter are not shown in FIG. 9.

The integrated driving information file 401 is a file in a format in which a header section 402 having header information, a metadata section 403 where the contents of the picture data 405 are described, and a metadata section 404 where the contents of the picture data 406 are described are added to the picture data 405 and 406. The time count value (time t11) is added to the picture data 405 and the metadata section 403, and the time count value (time t12) is added to the picture data 406 and the metadata section 404.

In FIG. 9, the picture data 405 shows the picture just before a minor collision between the vehicle 120 and the vehicle 130, and the picture data 406 shows the picture just after the collision.

The encoding unit 105 describes, in the header section 402 of the integrated driving information file 401, ID information (ID=31) which uniquely identifies the picture data 405 and 406 and a URI indicating location information on the network 73 of the integrated driving information file 401 which is stored in the recording unit 106, based on the own vehicle data indicating the data of the vehicle 110 that is added by the acquired information sending unit 103.

Also, the encoding unit 105 describes the ID information (ID: 32, ID: 33) which specifies the integrated driving information files (not shown in the figures) that are created from the picture data which are taken by the other cameras 11 and 12 and the URIs which indicate the location information on the network 73 where the integrated driving information files are stored in the recording unit 106, as the related information for the integrated driving information file 401, in the header section 402 of the integrated driving information file 401. Arbitrary numbers are assigned to the ID information so that the numbers for the integrated driving information files are respectively different from another.

Also, as described above, the encoding unit 105 describes the URI in the header section 402 in the form of "(protocol for accessing storage medium)://(network address of storage medium)/(file name of picture data)". In the "protocol for accessing storage medium", a communication protocol for accessing the integrated driving information file 401 which is stored in the storage medium 61, 62 and 63 on the network is described. As the communication protocol, "http", "ftp" and others may be used. In the "network address of storage medium", an address indicating the location information on the network 73 of the storage medium where the integrated driving information file 401 is stored by the recording unit 106 is described.

The encoding unit 105 acquires the network address of the storage medium from the recording unit 106. Upon receipt of a signal inquiring of the URI of the storage medium which stores the integrated driving information file from the encoding unit 105, the recording unit 106 selects an arbitrary medium from among the storage mediums in the URI list 71 of the information storage server, and transfers the selection to the encoding unit 105.

In the "file name of picture data", a file name of the picture data which is specified by the encoding unit 105 when it encodes the picture data is described. Any file name may be described unless all the file names for the picture files are different from each other.

For example, the encoding unit 105 describes the URI of the integrated driving information file 401 "http://xxx/1.mpg", the URI of the integrated driving information file relating to the camera 12 "http://yyy/2.mpg", and the URI of the integrated driving information file relating to the camera 11 "http://zzz/3.mpg".

If the URIs of the related information are described like this, even when a user wants to view the picture data which are taken by the other cameras 11 and 12 while viewing the integrated driving information file 401, the user can easily acquire the desired integrated driving information file by referring to the header information in the header section 402 of the integrated driving information file 401 he is now viewing.

Then, the encoding unit 105 creates the metadata sections 403 and 404 which are to be added to the picture data 405 and 406. First, the encoding unit 105 describes the camera parameter information that is the picture-related information in the metadata sections 403 and 404.

The encoding unit 105 acquires the ID information which is added to each picture data for every camera transferred from the receiving unit 104, and the ID information which is added to the picture-related information for every camera. Then, the encoding unit 105 selects the picture-related information whose added the ID information is the same as the ID information of each picture data from among the picture-related information, and the encoding unit 105 acquires the contents described in the selected picture-related information.

As shown in FIG. 8, the same ID information (ID: 21) is added to the header section 305 of the picture information 300 and to the header section 315 of the picture-related information 310 which are both related to the same camera 13. Therefore, the encoding unit 105 selects the picture-related information 310 as the picture-related information corresponding to the picture information 300, and acquires its description contents, that is, the camera parameter information 311 and 312.

In each of the camera parameter information 311 and 312, the changes of the camera parameter information is described at the times counted by the time counter that are the same as the times that were used for the picture data 301 and 302 of the picture information 300. The encoding unit 105 describes the camera parameter information 311 and 312 as metadata so as to synchronize with the picture data 301 and 302 based on the time count values of this time counter.

More specifically, the encoding unit 105 describes the camera parameter information of the camera 13 at the time t11 when the camera 13 took the picture shown by the picture data 402 in the metadata section 403, and describes the camera parameter information of the camera 13 at the time t12 when the camera 13 took the picture shown by the picture data 406 in the metadata section 404. As shown in FIGS. 8 and 9, the shutter speed "30" that is described in the camera parameter information 311 is described in the metadata section 403, and the shutter speed "30" that is described in the camera parameter information 312 is described in the metadata section 404. In FIG. 8, the other camera parameter information such as an angle of view is not shown here.

The encoding unit 105 describes the camera parameter information in the metadata section 403 and 404, and then, describes the driving-related information that is acquired by the respective sensors of the driving information acquiring unit 102 in the metadata sections 403 and 404. The time count values counted by the time counter which are the same as the time count values for the picture data 405 and 406 are respectively added to the driving-related information that is acquired by the sensors of the driving information acquiring unit 102. The encoding unit 105 describes the driving-related information that is acquired at the time t11 by the sensors of the driving information acquiring unit 102 in the metadata section 403 of the picture data 405 that is taken at the t11, and the encoding unit 105 describes the driving-related information that is acquired at the time t12 by the sensors of the driving information acquiring unit 102 in the metadata section 404 of the picture data 406 that is taken at the time t12, based on these time count values.

As shown in FIG. 9, the accelerator manipulated variable "10" which is part of the driving-related information is described in the metadata section 403, and the accelerator manipulated variable "11" is described in the metadata section 404. The other driving-related information such as a brake manipulated variable is not shown in FIG. 8.

The encoding unit 105 describes the driving-related information in the metadata sections 403 and 404, and then describes the vehicle registration numbers, which is the other vehicle data that the vehicle data receiving unit 107 acquired from the other vehicles, in the metadata sections 403 and 404.

The time count values counted by the time counter that are the same as the time count values for the picture data 405 and 406 are also added to the other vehicle data that is acquired by this vehicle data receiving unit 107. The encoding unit 105 describes the vehicle registration numbers which the vehicle data receiving unit 107 received at the time t11 in the metadata section 403 of the picture data 405 that is taken at the time t11, and the encoding unit 105 describes the vehicle registration numbers which the vehicle data receiving unit 107 received at the time t12 in the metadata section 404 of the picture data 406 that is taken at the time t12.

For example, as shown in FIG. 9, the encoding unit 105 describes the registration number ○○ of the vehicle 120 and the registration number ΔΔ of the vehicle 130 which the vehicle data receiving unit 107 received at the time t11 in the metadata section 403, and the encoding unit 105 describes the registration number ○ ○ of the vehicle 120 and the registration number ΔΔ of the vehicle 130 which the vehicle data receiving unit 107 received at the time t12 in the metadata section 404.

As described above, since the directivity of the receiver 35 of the vehicle data receiving unit 107 matches with the viewing angle of the camera 13, the pictures of the vehicles whose registration numbers are described in the metadata sections 403 and 404 come out (appear) in the picture data 405 and 406 which correspond to the metadata sections 403 and 404, respectively.

In order to identify which vehicle's number the registration number ○○ is, the vehicle 120 or the vehicle 130 which come out in the picture data 405, the vehicle registration numbers are added with the intensity of the signals that are received by the receiver 35 of the vehicle data receiving unit 107 and are then described.

The picture-related information, the driving-related information and the other vehicle data are described in the metadata sections 403 and 404 by using a TextAnnotation descriptor which is defined by the MPEG7 standard. Each data is described with this descriptor, and the descriptor is thereby encoded and added to the picture data.

The encoding unit 105 transfers the integrated driving information file 401 which is created as described above and the integrated driving information file concerning the picture data that are taken by the cameras 11 and 12 to the recording unit 106.

Next, the recording unit 106 records each data that is transferred from the encoding unit 105 in the recording medium (Step S105).

More specifically, when the information storage server 60 receives the integrated driving information file 401 that is transferred from the encoding unit 105 and the integrated driving information file concerning the picture data that are respectively taken by the cameras 11 and 12, the recording unit 106 stores the integrated driving information in the storage mediums that are indicated by the URIs described in the header information of the files under the file names which are indicated by the URIs.

As shown in FIG. 3, the integrated driving information file 401 is stored in the storage medium 61. Also, the integrated driving information file 452 concerning the picture data that is taken by the camera 11 is stored in the storage medium 62, and the integrated driving information file 453 concerning the picture data that is taken by the camera 12 is stored in the storage medium 63.

The operation of the recording unit 106 which is performed when the recording unit 106 searches the data that are stored in the storage mediums 61 and 62 of the recording unit 106 for the desired data in order to analyze a vehicle accident will now be explained below.

First, a searcher enters a keyword specifying the picture to be searched for by using an input unit such as a keyboard in the information storage server 60. As a keyword, the content described with a descriptor "UniqueIdentifier", "MediaLocator", or "TextAnnotation" which is defined by the MPEG7 standard is used. The ID information and the URI that are described in the header section 402 in the above-mentioned integrated driving information file 401, the picture-related information, the driving-related information and the vehicle data that are described in the metadata sections 403 and 404 may also be used.

For example, when the searcher enters a keyword "vehicle registration number ○○" indicating the "vehicle 120", the information storage server 60 searches the stored information list 72 and displays a list of the integrated driving information files concerning the picture data showing the vehicle 120 in which the "vehicle registration number ○○" is described, such as the integrated driving information file 401, on the monitor.

When the searcher adds a keyword "vehicle registration number ΔΔ" indicating the "vehicle 130", the information storage server 60 performs the search, and displays a list of the information files having the picture data where the vehicles 120 and 130 come out, such as the integrated driving information file 401, on the monitor.

Here, when the searcher specifies the integrated driving information file 401, the information storage server 60 displays the pictures that are shown in the picture data 405 and 406 on the monitor. Thereby, the searcher can obtain the pictures just before and after the accident of the vehicles 120 and 130.

At that time, the information storage server 60 displays the information that are described in the integrated driving information file such as the camera parameter information, the driving-related information and the URI, as well as the picture data 405 and 406, on the monitor. Thereby, the searcher can obtain the more detailed information.

When the searcher analyzes the accident, the searcher can use the picture data of the vehicle 110 which has no relation to the vehicles 120 and 130 that were involved in the accident. Therefore, the searcher can obtain the pictures where both the vehicles 120 and 130 which were involved in the accident come out so as to ensure the analysis of the accident without fail. On the other hand, if the searcher can obtain only the pictures that were taken by the camera of the vehicle 120 or the vehicle 130 which was involved in the accident, the searcher can obtain only the pictures where the one of these vehicles comes out, and therefore it is difficult to analyze the accident.

Also, since the searcher can obtain the information of the vehicle 110 which has no relation to the vehicles 120 and 130 that were involved in the accident, the searcher can obtain the pictures just after the accident without damage when the searcher analyzes the accident. There is a possibility that the cameras of the vehicles which were involved in the accident are broken, and if the respective cameras of the vehicles that were involved in the accident are broken, it is difficult to obtain the pictures just after the accident from the vehicles that were involved in the accident.

Also, as described above, since the encoding unit 105 describes different types of information, that is, the ID information, the URI, the picture-related information, the driving-related information and the vehicle data, in the integrated driving information file 401 by using three descriptors including "UniqueIdentifier", "MediaLocator", and "TextAnnotation", the searcher can easily search for the different types of data when the searcher refers to the information.

For example, the searcher not only can easily acquire the precipitation at that time which is added to the picture data from that picture data of rain that is searched based on the content that is described by the descriptor "TextAnnotation", but the searcher also can easily acquire the camera parameter information such as the angle of view, orientation angle and shutter speed of the camera which took the picture that was added to the picture data.

Furthermore, the searcher can easily acquire the data of the location that is indicated by the URI of the related information that is described in the header section of the integrated driving information file which is being referred to, that is, the data concerning the picture that was taken by the different camera at the same time.

In the first embodiment, the receiver 35 is mounted on the camera 13 for taking forward pictures on the vehicle 110, but the receivers may be mounted on the other cameras 11 and 12 so as to add the other vehicle data indicating the presence of the other vehicles to the pictures of these cameras.

Also, the pictures may be taken and the picture-related information and the driving-related information may be acquired on an intermittent basis as described above, or on a continuous basis.

Also, the cameras 11, 12 and 13 may be mounted either inside or outside of the vehicles. A plurality of cameras mounted on the vehicle allow for the pictures to be acquired even in a blind spot which cannot be recorded by a single camera. A plurality of cameras having different camera characteristics such as an angle of view, sensitivity and a shutter speed may be mounted on the vehicle.

The advantage of recording the pictures by using the cameras having different camera characteristics such as an angle of view, sensitivity and a shutter speed is that a camera that matches the characteristics can record information as a picture even if the information cannot be acquired by another camera that does not match the characteristics. For example, with respect to an angle of view as one of the camera characteristics, a wide-angle lens allows for a wide-range picture surrounding the vehicle at once to be taken which thereby makes it possible to grasp the overall circumstances of the vehicle, while a telephoto lens allows for a picture of a far away road sign or another vehicle going far ahead of the vehicle to be taken.

With respect to sensitivity as a camera characteristic, a high-sensitive camera allows for a clear picture even at night or in an underlit place to be taken, and an infrared camera allows for a picture of a human being or an animal to be taken even in an underlit environment. Also, with respect to a frame rate of an acquired picture as a camera characteristic, a camera with a high shutter speed allows for a clear picture of a high-speed moving object to be taken.

As described above, if a plurality of cameras having various camera characteristics are mounted on the vehicle, it becomes possible to take multifaceted pictures of and grasp the surrounding circumstances of the vehicles. Therefore, it is possible to determine the causes of the traffic accident at the time of the accident, to analyze the driver's driving skill and to analyze the vehicle's response more accurately. The shutter speed and the angle of view of the camera, or the position and attitude (orientation angle) of the camera against the vehicle body can be dynamically changed, and these values are acquired by the camera parameter acquiring units 14, 15 and 16. The camera parameter acquiring unit 14, 15 and 16 can be realized by using the existing camera control technology used for a surveillance camera or the like, for instance.

Also, when the searcher searches for information, the searcher may access the information storage server 60 from his own terminal via the network 73 so as to display the information that is searched for by the information storage server 60 on the monitor of his terminal.

Furthermore, a transmitter that transmits a radar beam to the vehicle 110, and a receiver that receives the radar beam transmitted and reflected against the other vehicle (the vehicle 120, for instance) and calculates the speed of the other vehicle (the vehicle 120) based on the received radar beam may be mounted on the vehicle 110 so as to describe the calculated speed in the metadata section 403. Thereby, a user can obtain the speed of the vehicle 120 which was involved in the accident and further analyze the accident easily.

Next, the vehicle information recording system 100 of the first embodiment will be explained by using another case example than the case example shown in FIG. 6.

(Case 2)

Figure 10:
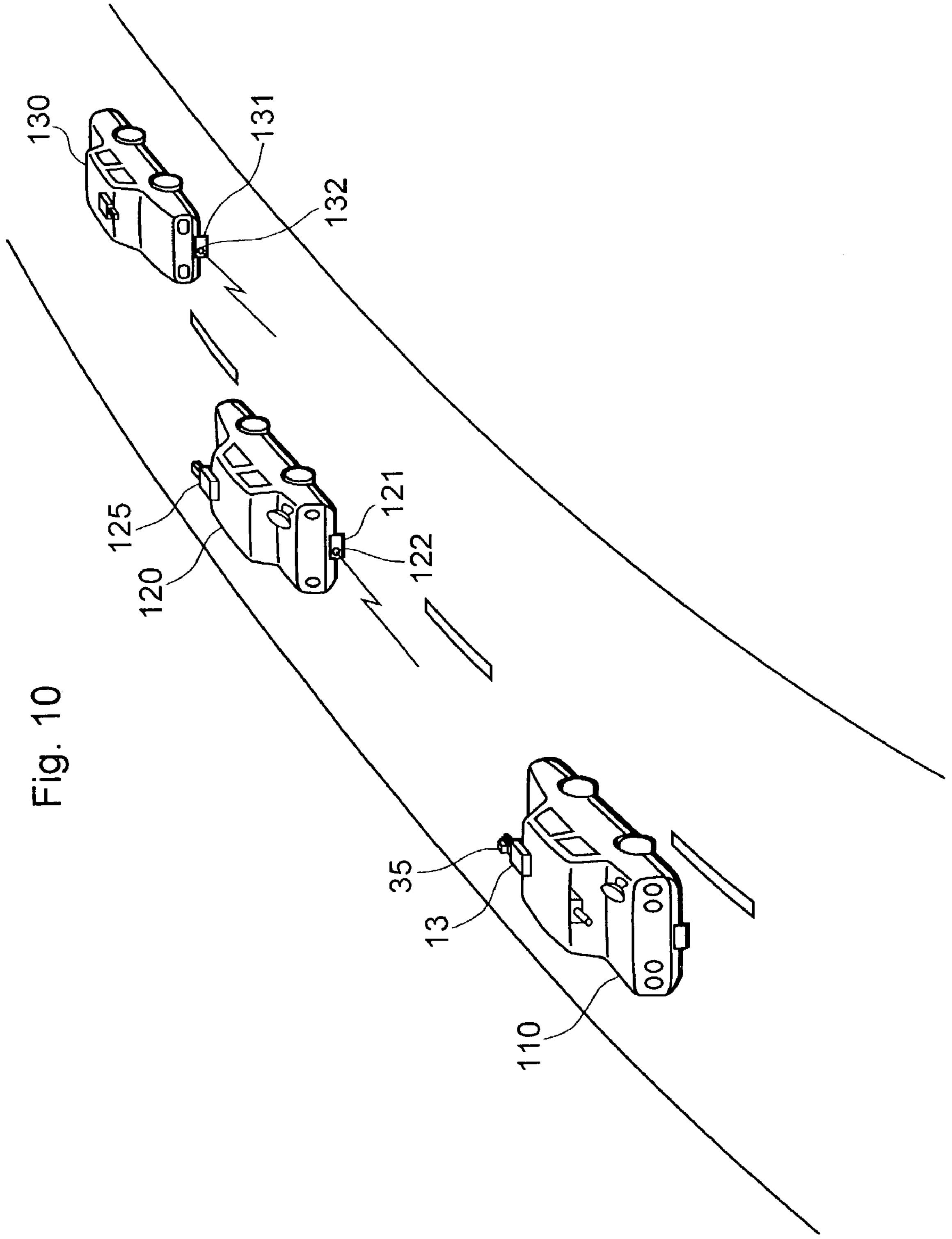
FIG. 10 is a diagram showing another running condition on the road of the vehicles which are equipped with the vehicle information recording system.

FIG. 10 is a diagram showing a running condition on the road of the vehicles which are equipped with the vehicle information recording system 100. FIG. 10 shows the running condition on the road of the vehicle 110. FIG. 10 is different from FIG. 6 in that the vehicles 120 and 130 are equipped with the in-vehicle information acquiring unit 140 shown in FIG. 1 just like the vehicle 110. Since the other points between the first and second case examples are same, the explanation thereof will be omitted.

As for the vehicle 110, the integrated driving information file 401 is stored in the recording unit 106, as described above.

Also, as for the vehicle 120, the integrated driving information file 401 is stored in the recording unit 106.

Figure 11:
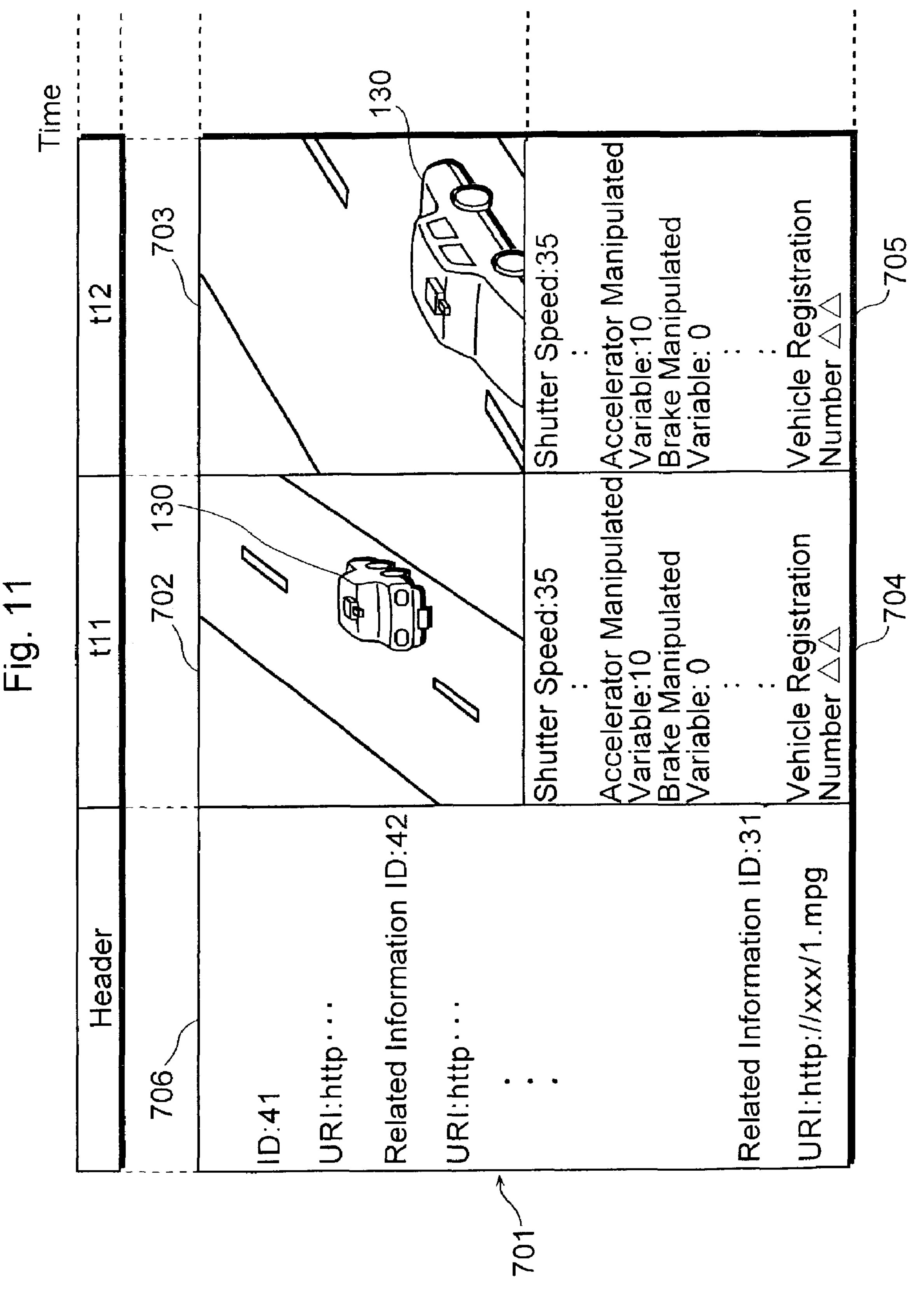
FIG. 11 is a data diagram showing another integrated driving information file which is created by the encoding unit in the vehicle information recording system.

FIG. 11 is a data diagram showing the integrated driving information file concerning the picture data that is taken by the camera 125 which is mounted on the vehicle 120 for taking forward pictures.

The integrated driving information file 701 has a format in which the header section 706 having header information, the metadata section 704 where data concerning the picture data 702 is described, and the metadata section 705 where data concerning the picture data 703 is described are added to the picture data 702 and 703, respectively.

In the header section 706, the ID information (ID=41) which uniquely specifies which camera on which vehicle took the picture data 702 and 703 is described based on the own vehicle data indicating the information of the vehicle 120 that is added by the acquired information sending unit 103. Also, in the header section 706, the URI indicating the location information on the network where the integrated driving information file 701 is recorded, the URI indicating the location information on the network of the information file concerning the integrated driving information file 701 such as the integrated driving information file concerning the picture data that is taken by the other camera mounted on the vehicle 120, the ID information (ID: 42) and others are described.

The picture data 702 is the data of the picture ahead of the vehicle 120 that is taken at the time t11, while the picture data 703 is the data of the picture ahead of the vehicle 120 that is taken at the time t12.

In the metadata sections 704 and 705, the camera parameter information of the camera 125 such as the shutter speeds at the times t11 and t12, the driving information such as the accelerator manipulated variables and the brake manipulated variables, and the vehicle data (the vehicle registration number, for instance) which is specific to the vehicle 130 indicating that the vehicle 130 comes out in the picture data 702 and 703 are respectively described.

As described above, when the searcher searches for the picture data in which the vehicle 130 comes out based on the vehicle data of the vehicle 130, for instance, from among the data stored in the recording unit 106, the information storage server 60 searches for the integrated driving information file (the integrated driving information files 401 and 701, for instance) where the vehicle data of the vehicle 130 is described and displays the data on the monitor.

The searcher who analyzes the accident can analyze the circumstances just before the accident in detail based on the picture data 405 which is obtained from the integrated driving information file 401 shown in FIG. 9, and the picture data 702 which is obtained from the integrated driving information file 701 shown in FIG. 11. Here, the picture data 405 was taken by the camera on the vehicle 110 at the time t11 in which the vehicles 120 and 130 come out, and the picture data 702 was taken by the camera on the vehicle 120 at the time t11 in which the vehicle 130 comes out.

The searcher who analyzes the accident can also analyze the circumstances just after the accident, at the time t12, in detail in the same manner based on the picture data 406 (See FIG. 9) which was taken by the camera on the vehicle 110 in which the vehicles 120 and 130 come out and the picture data 703 (See FIG. 11) which was taken by the camera on the vehicle 120 in which the vehicle 130 comes out.

Also, the searcher who analyzes the accident can obtain the driving-related information of the vehicle 120 which was involved in the accident such as the accelerator manipulated variable and the brake manipulated variable based on the data which is described in the metadata sections 704 and 705 of the integrated driving information file 701, and the searcher can thereby analyze the accident in more detail based on the driving-related information just before and after the accident. For example, since the brake manipulated variables before and after the accident are the same, it is conceivable that the driver of the vehicle 120 was driving inattentively.

As mentioned above, the searcher can search both the integrated driving information file 401 concerning the picture data that was taken by the camera on the vehicle 110 and the integrated driving information file 701 concerning the picture data that was taken by the camera on the vehicle 120 based on the description of the vehicle data (vehicle registration number) of the vehicle 130 in the metadata section, and the searcher can also cross-reference the integrated driving information files 401 and 701.

In this case, the encoding unit 105 may describe the URI where one information file is recorded in the header section of the other information file, among the integrated driving information files 401 and 701. Thereby, it becomes possible to search for these integrated driving information files easily and cross-reference them.

This URI is described in the following manner. According to the instruction of the encoding unit 105, the information storage server 60 searches the stored information list 72 for the integrated driving information file concerning the vehicle 120 in which the vehicle 120 comes out. Then, the encoding unit 105 describes the URI (http://XXX/1.mpg) of the integrated driving information file 401 that is obtained as a result of the search by the information storage server 60 in the header section 706 of the integrated driving information file 701, as shown in FIG. 11.

Thereby, while the searcher is viewing the picture data 702 and 703 that were taken by the camera on the vehicle 120, the searcher can further search for the picture data 405 and 406 in which the vehicle 120 comes out based on the above URI and cross-reference them.

As mentioned above, the searcher can analyze the accident in detail based on a lot of information by cross-referencing the information that was obtained from the vehicle 120 which was involved in the accident and the vehicle 110 which has nothing to do with the accident.

In the above case, the picture data that were taken by the cameras mounted on the vehicles 110 and 120 are cross-referenced, but all the picture data that were taken by the cameras mounted on the vehicles 110, 120 and 130 may be cross-referenced so as to analyze the accident in more detail.

Furthermore, in the above case, the information storage server 60 searches for the integrated driving information file 701 concerning the picture data that was taken by the camera on the vehicle 120 by using the other vehicle data specifying the vehicle 130 which comes out in that picture data as a keyword. However, the information storage server 60 may search by using the own vehicle data specifying the vehicle 120, that is, the ID information (ID: 41) that is described in the integrated driving information file 701 as a keyword.

The vehicle information recording system 100 of the first embodiment as described above will now be explained by using yet another case example.

(Case 3)

Figure 12:
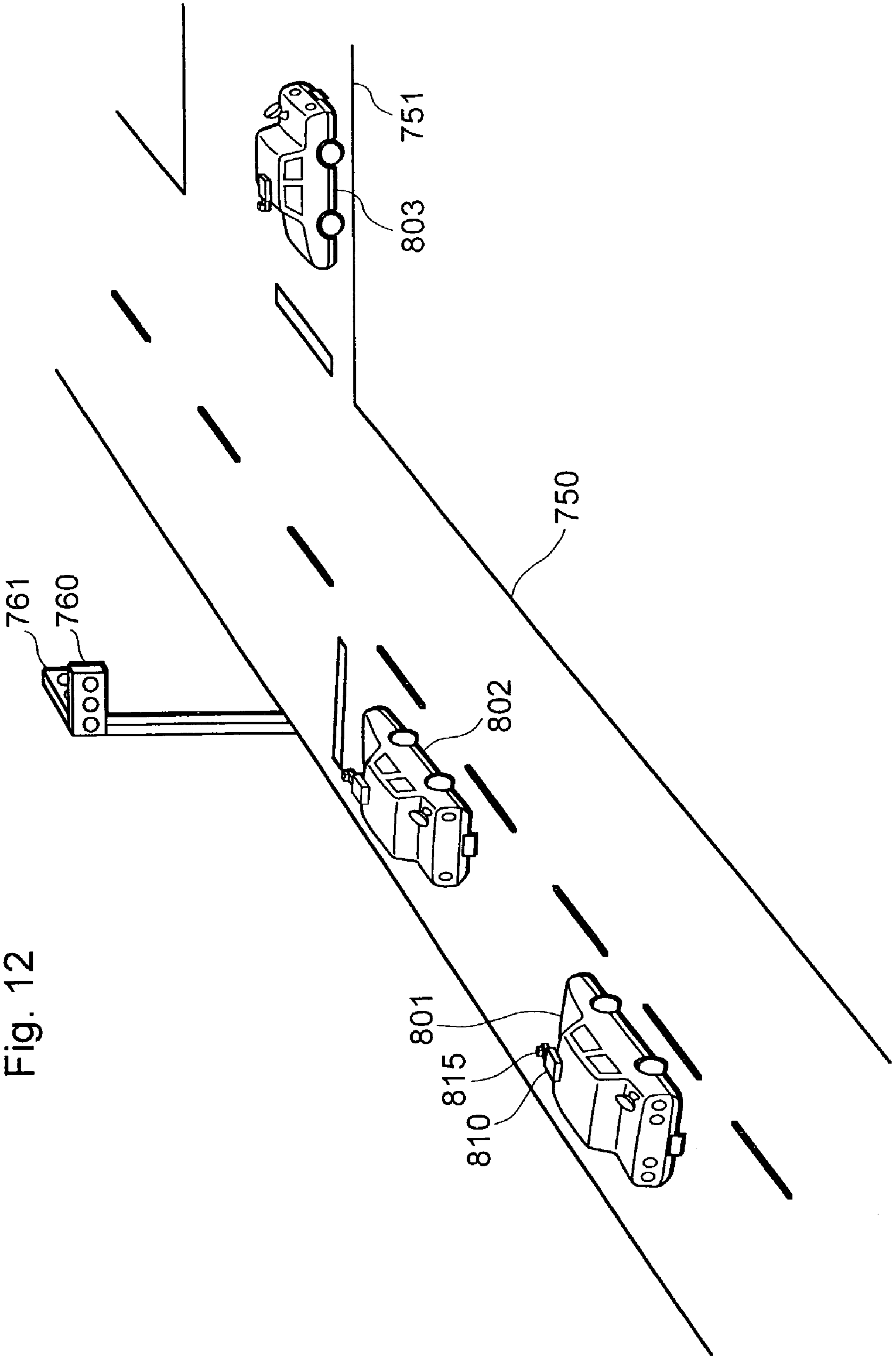
FIG. 12 is a data diagram showing yet another running condition on the road of the vehicles which are equipped with the vehicle information recording system.

FIG. 12 is a diagram showing the running condition on the road of the vehicles which are equipped with the vehicle information recording system 100.

The vehicle information recording system 100 includes the in-vehicle information acquiring units 140 (See FIG. 1) which are respectively mounted on vehicles 801, 802 and 803, and the receiving unit 104, the encoding unit 105 and the recording unit 106 (See FIG. 1) which are mounted separately from the vehicles 801, 802 and 803.

As shown in FIG. 12, the vehicle 801 is equipped with a camera 810 in the picture acquiring unit 101*a* and a receiver 815 in the vehicle data receiving unit 107.

In FIG. 12, the vehicle 802 is running ahead of the vehicle 801 on a main road 750 in the same direction. The vehicle 803 is running on a side road 751 that intersects with the main road 750. A traffic light 760 for the main road 750 and a traffic light 761 for the side road 751 are located at the intersection between the main road 750 and the side road 751.

The data from each unit of the vehicle 801 is stored in the recording unit 106 in the same way as that described above with respect to case 1 in FIG. 6.

In the vehicle information recording system which is explained in FIG. 6, the receiver 35 which is mounted on the vehicle 110 receives the other vehicle data signal that is transmitted from the other vehicle. However, in case 3, the receiver 815 which is mounted on the vehicle 801 receives color information that is indicated by the traffic light placed in the range of the directivity of the receiver 815 in addition to the other vehicle data signal. Since the receiving directivity of the receiver 815 is predetermined so as to match with the viewing angle of the camera 810, the receiver 815 receives the color information of the traffic light seen in the picture that is taken by the camera 810.

The encoding unit 105 encodes the color information that is received by the receiver 815, and describes the encoded color information in the metadata section of the picture data by using a descriptor that is defined by the MPEG7 standard. At this time, a transmitter is mounted on the traffic light, and the transmitter transmits a color information signal indicating the color that is indicated by the traffic light and the receiver 815 receives the color information signal. Also, the receiver 815 may detect the color that is indicated by the traffic light.

Figure 13:
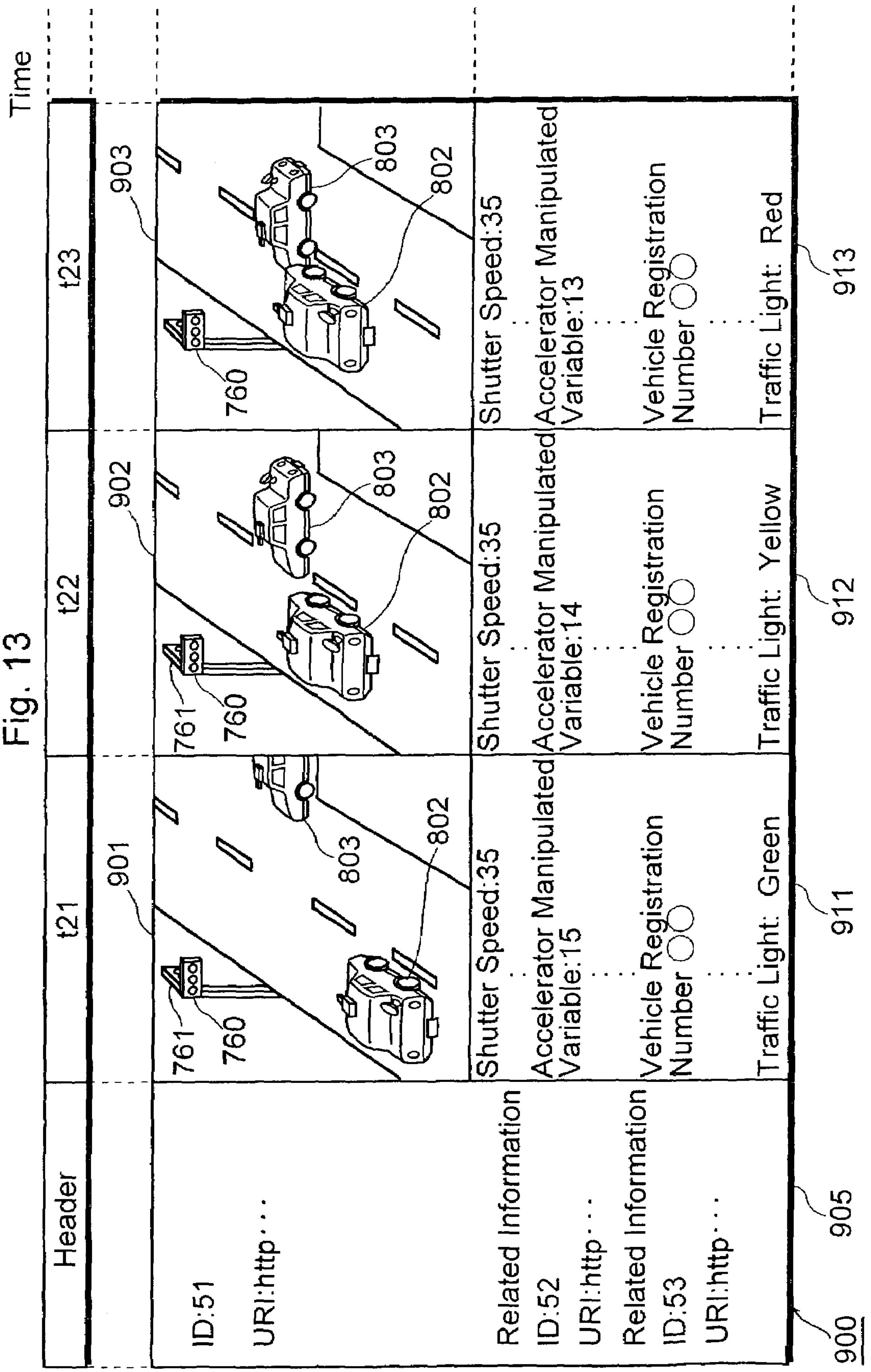
FIG. 13 is a data diagram showing yet another integrated driving information file which is created by the encoding unit in the vehicle information recording system.

FIG. 13 is a data diagram showing the integrated driving information file of the respective data of the vehicle 801 which is encoded by the encoding unit 105.

The integrated driving information file 900 includes the picture data 901, 902 and 903 to which the metadata sections 911, 912 and 913 where the metadata concerning these picture data are respectively described and the header section 905 are added.

The picture data 901, 902 and 903 are the data of the pictures that are taken by the camera 810 on the vehicle 801 at the times t21, t22 and t23, respectively.

The picture data 901 shows the picture data before the accident involving the vehicles 802 and 803, and the traffic light 760 in front of the vehicle 802 indicating a green light. The picture data 902 shows the picture data just before the accident involving the vehicles 802 and 803, and the traffic light 760 indicating a yellow light. The picture data 903 shows the picture data just after the accident involving the vehicles 802 and 803, and the traffic light 760 indicating a red light.

Described in the metadata sections 911, 912 and 913 are the camera parameter information such as the shutter speeds of the camera 810, the driving-related information such as the accelerator manipulated variables of the vehicle 801, the other vehicle data such as the registration numbers of the vehicle 802 and the color information indicated by the traffic light in the picture data, which are respectively obtained at the times t21, t22 and t23.

For example, in the metadata unit 911 where the content of the picture data 901 is described, the shutter speed "35" of the camera 810 at the time t21, the accelerator manipulated variable "15" of the vehicle 801 at the time t21, the registration number ○ ○ of the vehicle 802 that is acquired by the vehicle data receiving unit 107 at the time t21 and the color information (green) that is indicated by the traffic light 760 which comes out in the picture data 901 that is taken at the time t21 are described. Here, the receiver 815 on the vehicle 801 does not receive the other vehicle data signal that is transmitted from the vehicle 803 and the color information signal that is transmitted from the traffic light 761 because they are outside of the scope of the directivity of the receiver 815.

In the header section 905, the ID information (ID: 51) specifying which camera on which vehicle took the picture data 901, 902 and 903 and the URI indicating the location in the recording unit 106 where the integrated driving information file 900 is recorded are described. Also, in the header section 905, the ID information and URIs of the integrated driving information files concerning the picture data that are taken by the other camera on the vehicle 801 as the related information are described.

The operation of the recording unit 106 that is performed when the recording unit 106 searches for the desired data from among the data that are stored in the recording unit 106 so as to analyze the accident will now be explained below.

First, the searcher enters a keyword specifying the picture the searcher wants to search for in an input unit such as a keyboard in the information storage server 60.

For example, when the searcher enters the "vehicle registration number ○○" as a keyword indicating the "vehicle 802", the information storage server 60 displays on the monitor the list of the integrated driving information files, such as the integrated driving information file 900, concerning the picture data in which the vehicle 802 comes out and the "vehicle registration number ○○" is described.

Here, when the searcher specifies the integrated driving information file 900, the information storage server 60 displays the pictures that are shown by the picture data 901, 902 and 903 on the monitor.

At this time, the information storage server 60 displays on the monitor the information which are described in the integrated driving information file 900 such as the camera parameter information of the camera which took the picture data 901, 902 and 903, the driving-related information and the URI as well as these pictures. The information storage server 60 further displays the color information that is indicated by the traffic light 760 as the information which is described in the integrated driving information file 900.

Accordingly, the searcher can surely obtain the color information of the traffic light even when the color of the traffic light 760 is unclear in the pictures. This is very effective because the color that is indicated by the traffic light is a crucial factor for analyzing the cause of the accident.

For example, at the time t22 just before the accident, the traffic light 760 in front of the vehicle 802 is yellow but the vehicle 803 has already started moving even though the traffic light 761 in front of the vehicle 803 must still have been red. Further, at the time t23 when the traffic light 760 in front of the vehicle 802 turns red, the vehicles 802 and 803 come into minor collision. This information facilitates a determination as to the cause of the accident.

In FIG. 12, there is only one traffic light 760 in front of the vehicle 801. However, when there is another traffic light in front of the vehicle 801, the receiver 815 may detect the intensity (intense or faint) of the signals indicating the color information that are transmitted from the respective traffic lights, and the encoding unit 105 may add the data indicating the respective intensity of the signals to the color information that are indicated by the traffic lights so as to distinguish between the color information of the traffic light 760 and the color information of the other traffic light.

In the case 3 in FIG. 12, since the vehicle 803 is running in the direction that is orthogonal to the running direction of the vehicle 801, the receiver 815 on the vehicle 801 does not receive the other vehicle data signal that is transmitted from the vehicle 803. In this case, a vehicle data signal may be transmitted from the side of the vehicle 803 so that the vehicle 801 receives the vehicle data signal of the vehicle 803.

Also, by referring to not only the information from the vehicle 801 which has nothing to do with the accident but also the picture data that was taken by the cameras on the vehicles 802 and 803 which were involved in the accident and the driving-related information thereof, the cause of the accident can be determined more clearly. For example, the vehicle 802 and the traffic light 761 in front of the vehicle 803 come out in the pictures that are taken by the camera on the vehicle 803. By referring to the picture data that is taken by the camera on the vehicle 803 and the aforesaid picture data that is taken by the camera on the vehicle 801, the cause of the accident can be determined much more clearly.

Furthermore, the picture may be searched by using the color information that is transmitted from the traffic light as a keyword. Specifically, the picture data in which the vehicle 802 comes out and taken when the traffic light in front of the vehicle 802 indicates a green light around the time of the occurrence of the accident may be searched for by using the keyword. Alternatively, by searching and comparing the pictures that are respectively taken when the traffic light indicates yellow and red, it becomes possible to determine the cause of the accident.

Also, in the above-described embodiment, the vehicle data receiving unit 107 acquires the other vehicle data from the other vehicle data signal that is received by the receiver 35 or the receiver 815, but the present invention is not limited to this acquisition of the other vehicle data.

For example, it is conceivable that the picture acquiring unit 101*a* shown in FIG. 1 detects something in a vehicle shape from the acquired pictures. When the picture acquiring unit 101*a* detects a picture in which tire shapes on both sides of a registration plate shape comes out, it is determined that a vehicle is detected. Then, the picture acquiring unit 101*a* detects the vehicle registration number that is shown on the registration plate from the shapes of the numeric characters, and the vehicle data of the vehicle that is shown in the picture data can thereby be acquired.

As described above, in the vehicle information recording system 100 of the present invention, the encoding unit 105 adds the other vehicle data specifying the other vehicle that is received by the vehicle data receiving unit 107 to the picture data as the metadata relating to the picture data that is acquired by the picture acquiring unit 101*a*, and the recording unit 106 records the picture data in the recording medium. The recording unit 106 further searches for picture data showing the vehicle that is indicated by the other vehicle data by using the other vehicle data which is added to the picture data as a keyword.

Accordingly, in the vehicle information recording system 100 of the present invention, since the picture data of the vehicles which were involved in the accident that are taken by the other vehicle can be obtained, the cause of the accident can be analyzed based on that picture data. Specifically, in the vehicle information recording system 100, the objective pictures showing the overall situation of the accident, such as the pictures of both vehicles which were involved in the accident, can be obtained. Therefore, those who analyze the accident can make a clear analysis of the accident based on the obtained picture data. Also, since the camera of the other vehicle which was not involved in the accident is not damaged, the pictures just after the accident can be taken without fail.

On the other hand, in the conventional system, since only one of the vehicles which were involved in the accident comes out in the picture that is taken by the other vehicle concerned, it is difficult to determine a clear situation and cause of the accident based on that picture data. Also, in the conventional system, it is difficult to obtain the pictures just after the accident from the vehicles which were involved in the accident if the cameras on the vehicles concerned are damaged.

In the vehicle information recording system 100, the picture data that is acquired by the picture acquiring unit 101*a* which is mounted on the vehicle and the driving-related information that is acquired by the driving information acquiring unit 102 are recorded in a storage medium that is outside of the vehicle via radio communication. Thereby, there is no need for a tough shock-absorbing mechanism for preventing data loss due to a shock such as an accident, and the vehicle's behavior and the driver's condition can be checked and monitored in real time even in a remote site. Also, since the recording unit 106 has a plurality of storage mediums which are connected to each other via a network, the recording unit 106 can store an enormous amount of information.

Furthermore, since the encoding unit 105 adds various kinds of driving-related information as the metadata relating to the picture data by using a descriptor that is defined by the MPEG7 standard, the searcher can easily cross-reference the driving information. Also, even if an enormous amount of data is recorded in the recording unit 106, the searcher can easily search for the desired data by using the description content of the data as a keyword.

The Second Embodiment

The second embodiment of the present invention will be explained with reference to the drawings.

Figure 14:
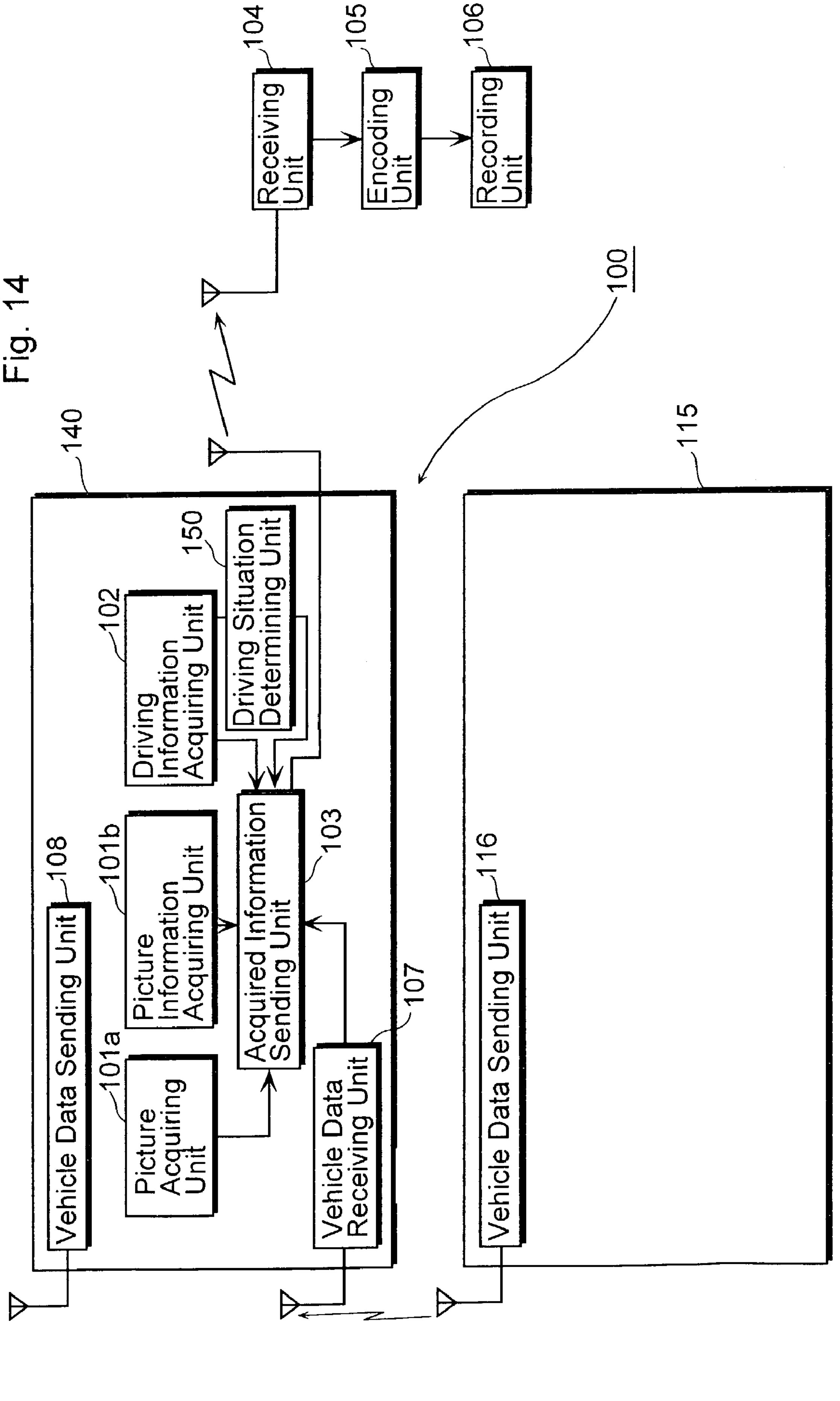
FIG. 14 is a block diagram showing an overall structure of the vehicle information recording system according to a second embodiment of the present invention.

FIG. 14 is a block diagram showing an overall structure of the vehicle information recording system according to the second embodiment of the present invention. In FIG. 14, the same reference numbers are assigned to the same units as those units described above with reference to FIG. 1, and the explanation thereof will be omitted.

The vehicle information recording system 160 shown in FIG. 14 is different from vehicle information recording system 100 shown in FIG. 1 in that the vehicle information recording system 160 additionally includes a driving situation determining unit 150 that determines a driving situation of a vehicle based on the information that is acquired by the driving information acquiring unit 102.

Figure 15:
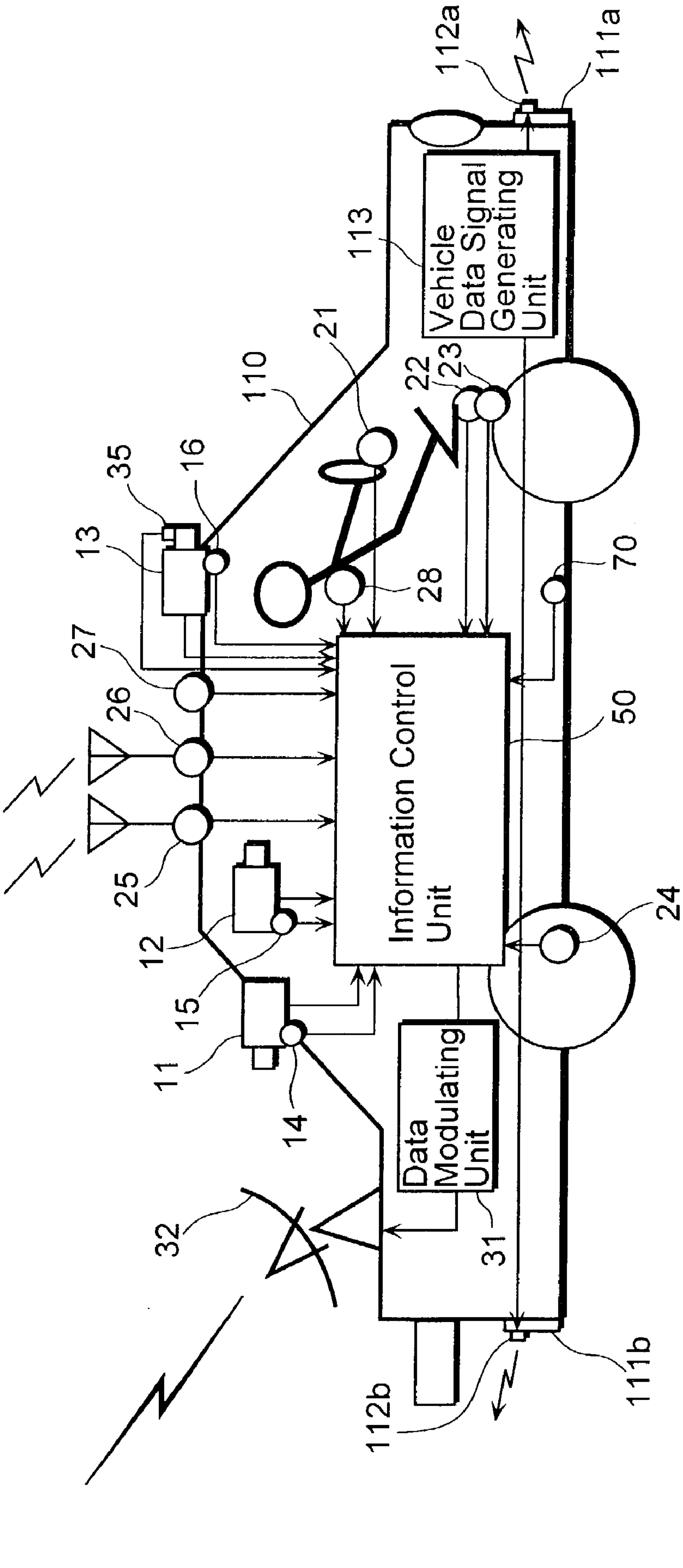
FIG. 15 is a diagram showing how respective units in the vehicle information recording system of the second embodiment are mounted in a vehicle.

FIG. 15 is a diagram showing how the respective units in the vehicle information recording system 160 are mounted on the vehicle 110.

In FIG. 15, the same reference numbers are assigned to the same units as those units described above with reference to FIG. 2, and the explanation thereof will be omitted. The vehicle information recording system 160 shown in FIG. 15 is different from the vehicle information recording system 100 shown in FIG. 2 in that the vehicle information recording system 160 additionally includes an acceleration sensor 70 that detects a shock on a vehicle as the driving information acquiring unit 102 shown in FIG. 14, and further, the information control unit 50 does a double function as the driving situation determining unit 150.

The driving situation determining unit 150 monitors the change of the output values outputted from the acceleration sensor 70, and when the driving situation determining unit 150 detects a sudden change at a fixed ratio or more, the driving situation determining unit 150 determines that an accident has occurred. When the driving situation determining unit 150 determines that the accident has occurred, the acquired information sending unit 103 notifies the emergency contact station of the accident.

The operations in the vehicle information recording system 160 structured as above for determining the driving situation and notifying the emergency contact station of the accident will be explained below.

The driving information acquiring unit 102 acquires respective driving-related information on an intermittent basis. The driving information acquiring unit 102 transfers the acquired driving-related information to the driving situation determining unit 150.

The driving situation determining unit 150 monitors the change of the values outputted from the acceleration sensor 70 of the driving information acquiring unit 102, and when the driving situation determining unit 150 detects a sudden change at a fixed ratio or more, the driving situation determining unit 150 determines that an accident involving the vehicle 110 has occurred. When the driving situation determining unit 150 determines that the accident has occurred, the driving situation determining unit 150 transfers the accident occurrence information to the acquired information sending unit 103.

Upon receipt of the accident occurrence information from the driving situation determining unit 150, the acquired information sending unit 103 notifies predetermined emergency contact stations such as a police office and an emergency medical center of the occurrence of the accident as well as the driving-related information such as the current location of the vehicle and the driver's condition via radio communication. This notice of the vehicle accident enables for measures to be quickly taken such as a call-out of a rescue crew, a fact-finding procedure for the cause of the accident and a removal of the vehicles involved, even if the driver who is injured cannot report the accident.

The acquired information sending unit 103 sends the data such as the picture data and the picture-related information that are acquired by the picture acquiring unit 101*a* and the picture information acquiring unit 101*b* to the outside of the vehicle, and the encoding unit 105 encodes the data that is received by the receiving unit 104 and records the encoded data in the recording medium of the recording unit 106. This is the same procedure as that performed in the first embodiment.

As described above, since the vehicle information recording system 160 of the second embodiment detects a vehicle accident and automatically sends the notice of the occurrence of the accident as well as the driving-related information of the vehicle that is obtained when the accident occurred to the institutions concerned such as a police office and an emergency hospital, it becomes possible to take measures for the accident quickly even if the driver who is injured cannot report the accident.

Although the acceleration sensor 70 is mounted so as to detect the occurrence of the vehicle accident in this case, any other sensor such as a gyroscope sensor for detecting the vehicle rolling and a shock sensor or a contact sensor for detecting the accident shock may be mounted so that the driving situation determining unit 150 determines that the accident has occurred when the output from such a sensor indicates a fixed value or more.

Also, the driving situation determining unit 150 may detect dangerous driving over the speed limit based on the speed information of the vehicle that is acquired by the driving information acquiring unit 102 and give a warning to the driver.

What is claimed is:

1. A vehicle information recording system comprising an information acquisition device which is placed in a vehicle and which acquires predetermined information, and an information management device which is placed outside of the vehicle and which stores and manages the information acquired by said information acquisition device;

wherein said information acquisition device includes:

a picture acquiring unit operable to take a picture of surroundings and to generate picture data showing the picture, said picture acquiring unit including a camera which is operable to take the picture of the surroundings;

an other vehicle data acquiring unit operable to acquire other vehicle data that is identification information which is uniquely assigned to each vehicle and which identifies an other vehicle shown in the picture data, said other vehicle data acquiring unit including a receiver which is operable to receive the other vehicle data transmitted from the other vehicle, wherein directivity of said receiver matches a viewing angle of a picture taken by said camera; and a sending unit operable to send sending data including own vehicle data which identifies the vehicle in which said information acquisition device is placed, the picture data and the other vehicle data; and wherein said information management device includes:

a receiving unit operable to receive the sending data sent by said sending unit;

an adding unit operable to add the other vehicle data and the own vehicle data which are included in the sending data, as related data, to the picture data included in the sending data received by said receiving unit;

a recording unit operable to record the picture data to which the related data is added on a recording medium; and a searching unit operable to search the data recorded in the recording medium for picture data which shows the other vehicle based on one of the added other vehicle data and own vehicle data.

2. The vehicle information recording system according to claim 1, wherein:

said information acquisition device further includes a driving information acquiring unit operable to acquire driving-related information concerning a driving situation of the vehicle;

said sending unit is operable to send the sending data including the driving-related information outside of the vehicle;

said adding unit is further operable to add the driving-related information included in the sending data received by said receiving unit to the picture data as related data; and said searching unit is operable to obtain the driving-related information together with the searched picture data.

3. The vehicle information recording system according to claim 2, wherein said searching unit is further operable to search the data recorded in the recording medium for desired picture data based on the driving-related information.

4. The vehicle information recording system according to claim 2, wherein:

said information acquisition device further includes a picture information acquiring unit operable to acquire picture-related information concerning a picture-taking condition of said picture acquiring unit, said sending unit is operable to send the sending data including the picture-related information outside of the vehicle, said adding unit is further operable to add the picture-related information included in the sending data received by said receiving unit to the picture data as related data, and said searching unit is operable to obtain the picture-related information together with the searched picture data.

5. The vehicle information recording system according to claim 4, wherein said adding unit is operable to encode at least one of the other vehicle data, the driving-related information and the picture-related information, and to add at least one of the encoded other vehicle data, driving-related information and picture-related information to the picture data.

6. An information management device in the vehicle information recording system according to claim 1, wherein said information management device is used for said vehicle information recording system comprising an information acquisition device which is placed in a vehicle and which acquires predetermined information and said information management device which is placed outside of the vehicle and which stores and manages the information acquired by said information acquisition device.

7. The vehicle information recording system according to claim 4, wherein:

the recording medium includes a plurality of recording mediums which are connected to each other via a network; and said adding unit is further operable to add location information where a first of two picture data is recorded on the network by said recording unit to the other picture data as related data, the first picture data being generated by said picture acquiring unit placed in one of a plurality of the vehicles, and the picture data of the two picture data other than the first picture data being generated by said picture acquiring unit placed in the other vehicle shown in the first picture data generated by said picture acquiring unit in the one of the plurality of vehicles.

8. An information acquisition device in the vehicle information recording system according to claim 1, wherein said information acquisition device is used for said vehicle information recording system comprising said information acquisition device which is placed in a vehicle which acquires predetermined information and said information management device which is placed outside of the vehicle and which stores and manages the information acquired by said information acquisition device.

9. The vehicle information recording system according to claim 1, wherein:

said information acquisition device further includes a color information acquiring unit operable to acquire color information indicated by a traffic light shown in the picture data;

said sending unit is operable to send the sending data including the color information acquired by said color information acquiring unit outside of the vehicle; and said adding unit is further operable to add the color information included in the sending data received by said receiving unit to the picture data as related data.

10. The vehicle information recording system according to claim 1, wherein the recording medium includes a plurality of recording mediums which are connected with each other via a network.

11. The vehicle information recording system according to claim 10, wherein said adding unit is further operable to add location information where the picture data is recorded on the network by said recording unit to the picture data as related data.

12. The vehicle information recording system according to claim 4, wherein the picture-related information includes a characteristic of said camera.

13. The vehicle information recording system according to claim 1, wherein the other vehicle data indicates a registration number of the other vehicle.

14. The vehicle information recording system according to claim 2, wherein the driving-related information acquired by said driving information acquiring unit includes one of behavior information indicating a driving behavior of the vehicle, environment information indicating a driving environment of the vehicle and driver information indicating a condition of a driver of the vehicle.

15. The vehicle information recording system according to claim 14, wherein:

the behavior information is at least one of a steering angle, an accelerator manipulated variable, a brake manipulated variable, a speed and a location of the vehicle;

the environment information is at least one of traffic information, temperature and precipitation; and the driver information is at least one of a pulse and a body temperature of the driver.

16. The vehicle information recording system according to claim 2, wherein said information acquisition device further includes a driving situation determining unit operable to determine a driving situation of the vehicle based on the driving-related information acquired by said driving information acquiring unit, and said sending unit is operable to notify an emergency contact station of an accident of the vehicle when said driving situation determining unit determines that the vehicle was involved in the accident.

17. A program for a vehicle information recording method performed by an information acquisition device in a vehicle information recording system comprising the information acquisition device which is placed in a vehicle and which acquires predetermined information, and an information management device which is placed outside of the vehicle and which stores and manages the information acquired by the information acquisition device, said program being recorded on a computer-readable medium and causing a computer to execute:

taking a picture of surroundings by using a camera which is placed in the information acquisition device, and generating picture data showing the picture;

acquiring other vehicle data that is identification information which is uniquely assigned to each vehicle and which identifies an other vehicle shown in the picture data, by receiving the other vehicle data transmitted from the other vehicle via a receiver located in the vehicle in which the information acquisition device is placed, wherein directivity of the receiver matches a viewing angle of a picture taken by the camera in said taking of the picture of the surroundings; and transmitting sending data including own vehicle data which identifies the vehicle in which said information acquisition device is placed, the picture data and the other vehicle data.

18. A vehicle information recording method for a vehicle information recording system comprising an information acquisition device which is placed in a vehicle and which acquires predetermined information, and an information management device which is placed outside of the vehicle and which stores and manages the information acquired by the information acquisition device, wherein, in the information acquisition device, said vehicle information recording method comprises:

taking a picture of surroundings by using a camera which is placed in the information acquisition device, and generating picture data showing the picture;

acquiring other vehicle data that is identification information which is uniquely assigned to each vehicle and which identifies an other vehicle shown in the picture data, by receiving the other vehicle data transmitted from the other vehicle via a receiver located in the vehicle in which the information acquisition device is placed, wherein directivity of the receiver matches a viewing angle of a picture taken by the camera in said taking of the picture of the surroundings; and transmitting sending data including own vehicle data which identifies the vehicle in which the information acquisition device is placed, the picture data and the other vehicle data, and wherein, in the information management device, said vehicle information recording method comprises:

receiving the sending data transmitted in said transmitting of the sending data;

adding the other vehicle data and the own vehicle data which are included in the sending data, as related data, to the picture data included in the sending data received in said receiving of the sending data;

recording the picture data to which the related data is added in a recording medium; and searching the data recorded in the recording medium for picture data which shows the other vehicle based on one of the added other vehicle data and own vehicle data.

* * * * *